US008093847B2

United States Patent
Otaguro

(10) Patent No.: US 8,093,847 B2
(45) Date of Patent: Jan. 10, 2012

(54) MOTOR DRIVE CIRCUIT, METHOD, AND DISC DEVICE USING THE SAME

(75) Inventor: Yoshito Otaguro, Kyoto (JP)

(73) Assignee: Rohm Co., Ltd. (JP)

( * ) Notice: Subject to any disclaimer, the term of this patent is extended or adjusted under 35 U.S.C. 154(b) by 580 days.

(21) Appl. No.: 12/295,215

(22) PCT Filed: Mar. 16, 2007

(86) PCT No.: PCT/JP2007/000245
§ 371 (c)(1),
(2), (4) Date: Sep. 29, 2008

(87) PCT Pub. No.: WO2007/122784
PCT Pub. Date: Nov. 1, 2007

(65) Prior Publication Data
US 2010/0177626 A1 Jul. 15, 2010

(30) Foreign Application Priority Data

Mar. 29, 2006 (JP) ................. 2006-092322
Mar. 29, 2006 (JP) ................. 2006-092326
Apr. 4, 2006 (JP) ................. 2006-103466

(51) Int. Cl.
*H02P 6/18* (2006.01)
(52) U.S. Cl. ......... 318/400.35; 318/400.34; 318/400.32; 318/700
(58) Field of Classification Search ............. 318/400.35, 318/400.34, 400.32, 700
See application file for complete search history.

(56) References Cited

U.S. PATENT DOCUMENTS

| 5,929,577 | A  | * | 7/1999  | Neidorff et al. | 318/400.35 |
| 6,633,145 | B2 | * | 10/2003 | Shao et al.     | 318/400.35 |
| 6,979,970 | B2 | * | 12/2005 | Iwanaga et al.  | 318/400.35 |
| 7,034,478 | B2 | * | 4/2006  | Bhaumik et al.  | 318/400.35 |
| 7,054,089 | B2 | * | 5/2006  | Kokami          | 360/73.03  |

FOREIGN PATENT DOCUMENTS

JP 3-207250 9/1991
(Continued)

OTHER PUBLICATIONS

Office Action for Chinese Application No. 200780011327.7 issued Jul. 14, 2010 with English translation.
International Search Report for International Application No. PCT/JP2007/000245 mailed Jul. 31, 2007 with English Translation.

(Continued)

*Primary Examiner* — Walter Benson
*Assistant Examiner* — David Luo
(74) *Attorney, Agent, or Firm* — Cantor Colburn LLP

(57) ABSTRACT

A back electromotive force detection circuit detects a zero-crossing point by comparing a back electromotive force Vu in at least one coil of a motor with a center tap voltage at a common node of the coils, and outputs a back electromotive force detection signal. A switching control circuit controls switching states of multiple switching circuits based upon the back electromotive force detection signal, thereby adjusting the current flowing through the coils. A window generating circuit outputs a window signal at a predetermined level during a period obtained by multiplying the cycle of the back electromotive force detection signal by a predetermined coefficient before the detection of the zero-crossing point. The switching control circuit stops the switching operation during a period in which the window signal is maintained at the predetermined level, thereby setting the state to the high impedance state that corresponds to a non-driving period.

38 Claims, 17 Drawing Sheets

FOREIGN PATENT DOCUMENTS

| | | |
|---|---|---|
| JP | 6-98587 A | 4/1994 |
| JP | 7-322679 A | 12/1995 |
| JP | 9-266690 | 10/1997 |
| JP | 10-243685 | 9/1998 |
| JP | 11-75388 | 3/1999 |
| JP | 11-299283 A | 10/1999 |
| JP | 11-341870 | 12/1999 |
| JP | 2001-190085 | 7/2001 |
| JP | 2001-197765 A | 7/2001 |
| WO | 2004/042912 | 5/2004 |

OTHER PUBLICATIONS

International Preliminary Report on Patentability for International Application No. PCT/JP2007/000245 dated Sep. 30, 2008 with English Translation.

Notification of Reason(s) for Refusal for Japanese Patent Application No. 2006-092326, drafted Aug. 5, 2011, dispatched Aug. 9, 2011, with English Translation.

Notification of Reason(s) for Refusal for Japanese Patent Application No. 2006-103466, dispatched Aug. 23, 2011, with English translation.

* cited by examiner

FIG.4A SIN_U
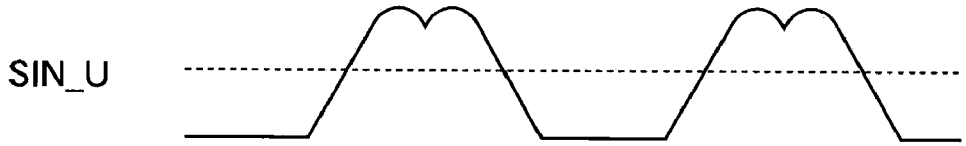
FIG.4B SIN_V
FIG.4C SIN_W
FIG.4D BEMF_EDGE
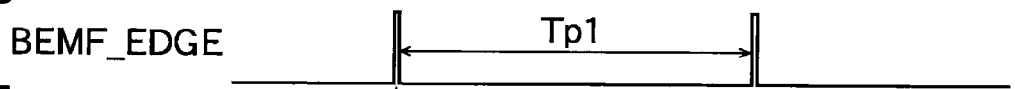
FIG.4E DRV
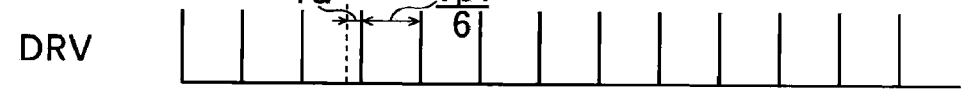
FIG.4F WINDOW
FIG.4G DRV_HU
FIG.4H DRV_HV
FIG.4I DRV_HW
FIG.4J DRV_LU
FIG.4K DRV_LV
FIG.4L DRV_LW

FIG.5A BEMF_EDGE
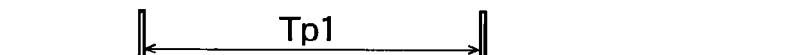
FIG.5B PULSE
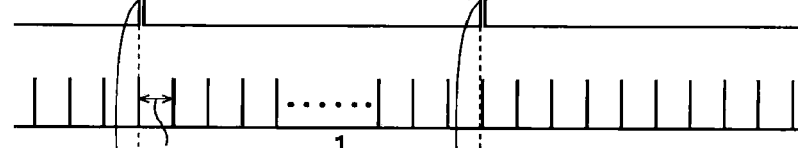
$Tp2 = Tp1 \times \frac{1}{n}$
FIG.5C OPEN_EDGE
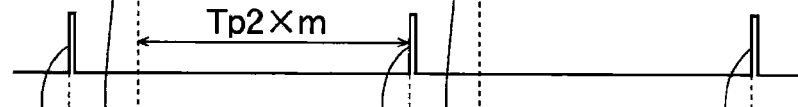
FIG.5D WINDOW
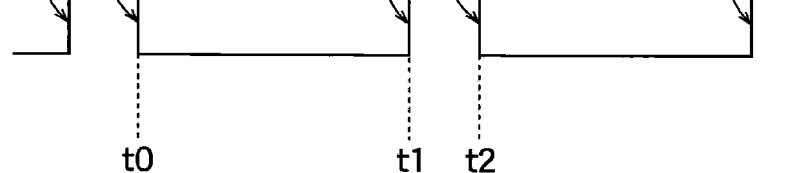

PWM

Vu, Vcom

BEMF_EDGE

FIG.10A SIN_U 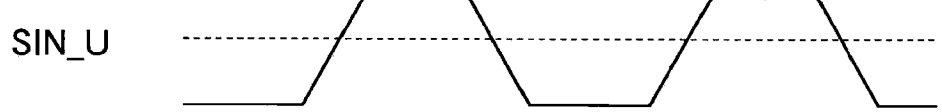
FIG.10B SIN_V 
FIG.10C SIN_W 
FIG.10D BEMF_EDGE 
FIG.10E DRV 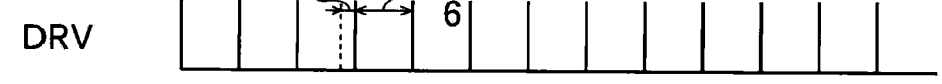
FIG.10F WINDOW 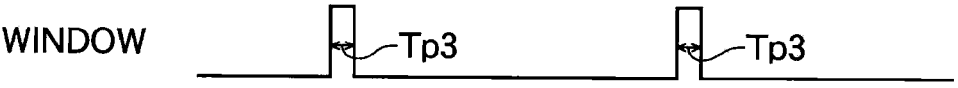
FIG.10G DRV_HU 
FIG.10H DRV_HV 
FIG.10I DRV_HW 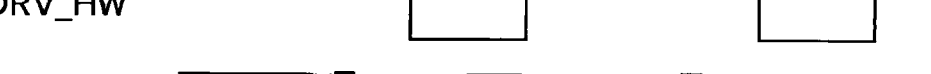
FIG.10J DRV_LU 
FIG.10K DRV_LV 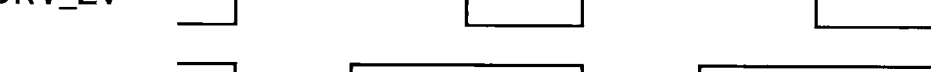
FIG.10L DRV_LW 

FIG.11A  Spwm
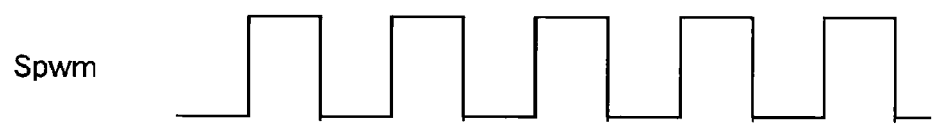
FIG.11B  Vu, Vcom
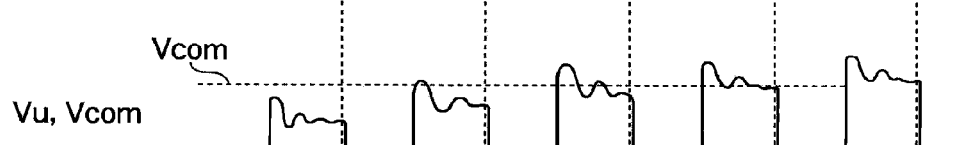
FIG.11C  Scmp
FIG.11D  NEDGE
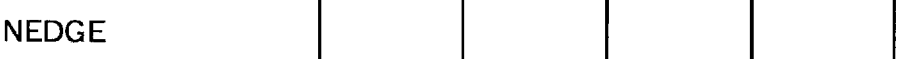
FIG.11E  BEMF_EDGE

FIG.16A
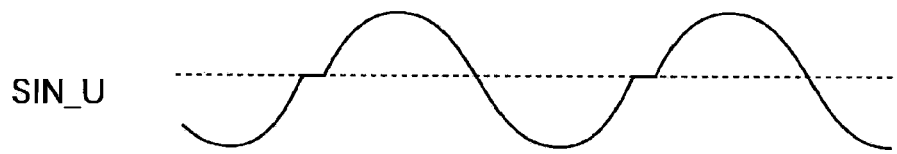
SIN_U
FIG.16B
SIN_V
FIG.16C
SIN_W
FIG.16D
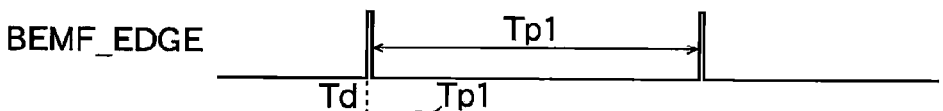
BEMF_EDGE
FIG.16E
DRV
FIG.16F
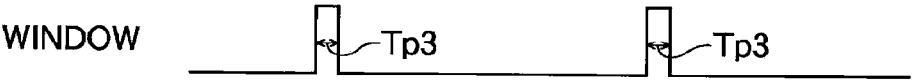
WINDOW
FIG.16G
DRV_HU
FIG.16H
DRV_HV
FIG.16I
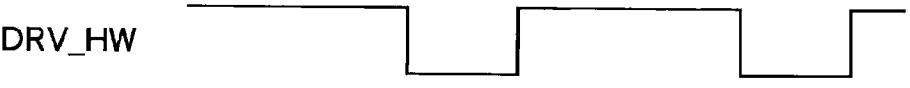
DRV_HW
FIG.16J
DRV_LU
FIG.16K
DRV_LV
FIG.16L
DRV_LW FIG.17A BEMF_EDGE
FIG.17B PULSE
FIG.17C OPEN_EDGE
FIG.17D WINDOW
FIG.17E CNT
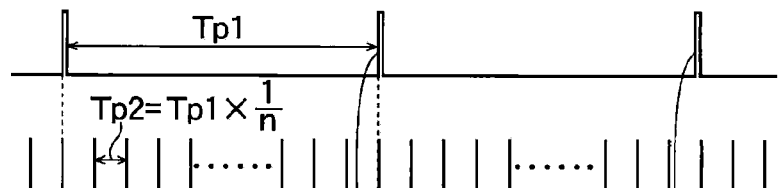
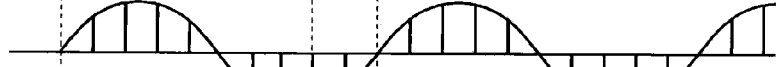

MOTOR DRIVE CIRCUIT, METHOD, AND DISC DEVICE USING THE SAME

CROSS REFERENCE TO RELATED APPLICATIONS

This is a U.S. national stage of application No. PCT/JP2007/000245 filed on 16 Mar. 2007. Priority under 35 U.S.C. §119(a) and 35 U.S.C. §365(b) is claimed from Japanese Application No. 2006-092322 filed 29 Mar. 2006, Japanese Application No. 2006-092326 filed 29 Mar., 2006, and Japanese Application No. 2006-103466 filed 4 Apr. 2006 the disclosure of which is also incorporated herein by reference.

BACKGROUND OF THE INVENTION

1. Field of the Invention

The present invention relates to a technique for controlling the rotation of a rotor, and particularly to a motor driving circuit which controls the rotation of a motor including a stator having multiple coils and a magnetic stator.

2. Description of the Related Art

In electronic devices employing disk-type media such as portable CD (Compact Disc) devices, DVD (Digital Versatile Disc) devices, etc., a brushless DC motor is employed for rotating the disk. In general, the brushless DC motor includes a rotor including a permanent magnet and a stator including multiple star-connected phase coils. With such an arrangement, in general, the coils are magnetized by controlling the current to be supplied to the coils, so as to relatively rotate the rotor with respect to the stator, thereby driving the brushless DC motor. In order to detect the rotational position of the rotor, in general, the brushless DC motor includes a sensor such as a Hall element, an optical encoder, or the like. With such an arrangement, the current to be supplied to each phase coil is switched according to the position detected by the sensor, thereby providing suitable torque to the rotor.

In order to provide a smaller-size motor, a sensor-less motor has been proposed, having a function of detecting the rotational position of the rotor without involving a sensor such as a Hall element (see Patent documents 1 and 2, for example). With such a sensor-less motor, for example, the electric potential at a common center tap in the motor (which will be referred to as the "center tap voltage" hereafter) is measured. Furthermore, the back electromotive force (induced voltage), which occurs in a coil, is monitored. Moreover, the position information is obtained by detecting the zero-crossing point at which the back electromotive force is equal to the center tap voltage.

In order to monitor the back electromotive force of a phase coil in the driving of such a sensor-less motor, there is a need to set the non-driving state at a timing of the zero-crossing point. In the non-driving state, a driver connected to the phase coil stops the switching driving operation, thereby setting the high-impedance state. In particular, in the driving of a sensor-less motor employing a 180 degree conduction method, the current flows through the coils in all the stages. Accordingly, such an arrangement needs to predict the timing at which the zero-crossing point occurs, and needs to set the high-impedance state based upon the prediction results.

1. For example, Patent document 5 discloses a method for providing a timing of setting the high-impedance state using the PLL (Phase Locked Loop) method.

2. Also, a related technique is described in Patent document 3.

3. Also, a technique is known in which the current passing through a phase coil is smoothly controlled in the shape of a sine wave or an arch-shaped waveform (see Patent documents 3 and 4, for example).

[Patent Document 1]
Japanese Patent Application Laid-Open No. Hei3-207250
[Patent Document 2]
Japanese Patent Application Laid-Open No. Hei10-243685
[Patent Document 3]
Japanese Patent Application Laid-Open No. Hei11-75388
[Patent Document 4]
Japanese Patent Application Laid-Open No. Hei11-341870
[Patent Document 5]
Japanese Patent Application Laid Open No. 2001-190085

Let us consider an arrangement in which the setting of the non-driving state is employed, and the non-driving period, in which the coil is set to the high-impedance state, is set to a long period of time. Such an arrangement has the advantage of detecting the zero-crossing point in a sure manner. However, this leads to the current flowing through the motor in a discontinuous waveform, resulting in increased noise produced by the motor. Accordingly, it is desirable that the non-driving period is reduced as much as possible. However, with such an arrangement that employs an extremely short non-driving period, in some cases, undesirable situations can occur, such as a situation in which the zero-crossing point does not match the timing of the non-driving period. Such a situation thus occurring leads to irregularities in the rotation of the motor. At worst, this leads to a problem of motor stoppage. Accordingly, there is a need to adjust and set the non-driving period according to the revolution of the motor and the change of the load.

Also, in order to continuously change the current that passes through the coil of the motor in the shape of a sine wave or an arch-shaped waveform, an arrangement is known in which the voltage to be applied to the coil of the motor is controlled by means of pulse modulation. FIGS. 7A through 7C are time charts which show the detection of the zero-crossing point in such an arrangement employing a pulse modulation driving method. FIG. 7A is a waveform diagram which shows a pulse modulated signal PWM. FIG. 7B is a waveform diagram which shows a phase voltage (which will also be referred to as the "back electromotive force Vu" hereafter) occurring at the coil, which is a detection target for the zero-crossing point, and a center tap voltage Vcom. FIG. 7C is a waveform diagram which shows a back electromotive force detection signal BEMF_EDGE.

As shown in FIG. 7B, noise components occur in the back electromotive force Vu that occurs in the coil, which is the detection target for the zero-crossing point, at the timing of the transition from the OFF state to the ON state of the pulse modulated signal shown in FIG. 7A, or the timing of the transition from the ON state to the OFF state. Such a noise component repeatedly switches the back electromotive force detection signal, which is obtained by making a comparison between the phase voltage Vu and the center tap voltage Vcom, between the high-level state and the low-level state. This leads to false detection of the zero-crossing point. A false detection of the zero-crossing point is equivalent to an error in detection of the position of the rotor. Accordingly, this leads to a problem of poor rotation precision, rotational malfunction, etc.

3. Furthermore, in order to control the current that passes through the phase coil using the PWM method, there is a need to control the driving current in the shape of a sine wave synchronously with the rotation state of the motor, i.e., the positional relation between the rotor and the stator. In a case in which the driving current is not controlled synchronously with the rotational state of the motor, problems occur such as a problem of noise occurring, a problem of motor rotation stoppage, etc.

SUMMARY OF THE INVENTION

1. The present invention has been made in view of such a situation. Accordingly, it is a general purpose of the present invention to provide a motor driving circuit having a function of adjusting and setting the period and timing of the non-driving state according to the rotational state of the motor.

2. Furthermore, it is another general purpose of the present invention to provide a technique for preventing false detection of the zero-crossing point for driving the motor using the pulse modulation method.

3. Moreover, it is yet another general purpose of the present invention to provide a motor driving circuit having a function of appropriately performing the sine-wave driving operation according to the rotational state of the motor.

1. An embodiment according to the present invention relates to a motor driving circuit which drives a multi-phase motor by supplying a driving current to the multi-phase motor. The motor driving circuit comprises: multiple switching circuits each of which is provided for a corresponding coil of the multi-phase motor, and each of which applies a high-level voltage or a low-level voltage to one terminal of the coil connected to the switching circuit; a back electromotive force detection circuit which detects a zero-crossing point by making a comparison between a back electromotive force which occurs in at least one coil of the multi-phase motor and a center tap voltage at a common node of the coils, and outputs a back electromotive force detection signal; a switching control circuit which controls the switching state of each of the multiple switching circuits based upon the back electromotive force detection signal output from the back electromotive force detection circuit so as to adjust the current that flows through the coils of the multi-phase motor; and a window generating circuit which outputs a window signal which is maintained at a predetermined level during a period of time obtained by multiplying the cycle of the back electromotive force detection signal output from the back electromotive force detection circuit by a predetermined coefficient before the detection of the zero-crossing point by means of the back electromotive force detection circuit. With such an arrangement, during a period of time in which the window signal output from the window generating circuit is maintained at the predetermined level, the switching control circuit stops the switching operation of the switching circuit, thereby setting the switching circuit to a high-impedance state.

The back electromotive force detection signal is generated with a frequency proportional to the revolution of the motor. Thus, such an arrangement is capable of adjusting and setting the non-driving period, in which the switching circuit is set to the high-impedance state for detecting the zero-crossing point, to be approximately proportional to the cycle of the back electromotive force detection signal, i.e., inversely proportional to the revolution of the motor.

With the predetermined coefficient as $\alpha$ ($\alpha$ is a real number which is greater than 0, and is smaller than 1), the window generating circuit may set the window signal to the predetermined level after the elapse of a period, which is obtained by multiplying the cycle of the back electromotive force detection signal by a coefficient $(1-\alpha)$, after the output of a back electromotive force detection signal from the back electromotive force detection circuit. Subsequently, when the back electromotive force detection circuit outputs the next back electromotive force detection signal, the window generating circuit may set the window signal to a level that differs from the predetermined level.

With such an arrangement, the switching circuit is set to the high-impedance state during a period proportional to the cycle of the back electromotive force detection signal. Furthermore, such an arrangement allows the timing at which the switching circuit is set to the high-impedance state to be set in a sure manner before the detection of the zero-crossing point.

The window generating circuit may include: a pulse signal generating circuit which receives the back electromotive force detection signal output from the back electromotive force detection circuit, and generates a pulse signal with a frequency n (n is an integer which is equal to or greater than 2) times that of the back electromotive force detection signal; and a timing setting unit configured such that the timing setting unit receives the back electromotive force detection signal from the back electromotive force detection circuit and the pulse signal from the pulse signal generating circuit, and when the timing setting unit detects m (m is an integer which is smaller than n) pulse signals after the detection of a back electromotive force detection signal, the timing setting unit sets the window signal to be the predetermined signal, following which, when the timing setting unit detects the next back electromotive force detection signal, the timing setting unit sets the window signal to a level that differs from the predetermined level.

The timing setting unit may include an adjustment means which allows the integer m to be adjusted. Such an arrangement allows the integer m to be changed according to the kind of motor connected to the motor driving circuit etc. This provides stable driving operation of the motor.

The pulse signal generating circuit may include: a frequency counter which measures the frequency of the back electromotive force detection signal; and a clock signal generating unit which generates a pulse signal with a frequency n (n is an integer which is equal to or greater than 2) times that of the frequency measured by the frequency counter. The frequency counter may count the clock signal at a predetermined frequency during a period from the point in time at which a back electromotive force detection signal is input up to a point in time at which the next back electromotive force detection signal is input, thereby measuring the cycle of the back electromotive force detection signal.

The clock signal generating unit may perform computation on the past K (K is an integer which is equal to or greater than 1) frequency values measured by the frequency counter, and may set the frequency of the pulse signal to be generated based upon the computation results.

The clock signal generating unit may include an adjustment means which allows the integer K to be adjusted. With such an arrangement, the gain of the feedback loop is increased according to the reduction in the integer K. In this case, such an arrangement is capable of being highly responsive to the change in the revolution of the motor. On the other hand, the gain of the feedback loop is reduced according to the increase in the integer K. In this case, such an arrangement allows the stability of the loop to be increased. Thus, such an arrangement provides optimum driving operation of the motor by setting the value of the integer K according to the kind of motor, the revolution thereof, and the driving method thereof.

The pulse signal generating circuit may further include: a storage unit which holds the past L (L is an integer which is equal to or greater than K) frequency values; and a computation unit which performs the predetermined computation based upon the frequency values held by the storage unit.

Also, the clock signal generating unit may generate a pulse signal with a frequency according to the computation results obtained by the computation unit. Also, the storage unit may be an L-stage shift register.

The computation unit may perform computation on the latest K frequency values from among the L frequency values held by the storage unit so as to determine the frequency of the pulse signal.

The timing setting unit may include: a counter configured such that the counter receives the back electromotive force detection signal output from the back electromotive force detection circuit and the pulse signal output from the pulse signal generating circuit, and when the counter counts in pulses of the pulse signal after the detection of a back electromotive force detection signal, the counter outputs an open edge signal at a predetermined level; and a window signal output unit configured such that, when the counter outputs the open edge signal at the predetermined level, the window signal output unit outputs a window signal at the predetermined level, following which, when the window signal output unit detects the next back electromotive force detection signal, the window signal output unit outputs the window signal at a level that differs from the predetermined level.

The motor driving circuit may be monolithically integrated on a single semiconductor substrate. Examples of a "monolithically integrated on a single semiconductor substrate" include an arrangement in which all the components of a circuit are formed on the semiconductor substrate; and an arrangement in which principal components of a circuit are monolithically integrated on the single semiconductor substrate. Such examples also include an arrangement in which a part of the resistors or capacitors for adjusting the circuit constants is provided externally to the semiconductor substrate. With such an arrangement, the motor driving circuit is monolithically integrated as a single LSI, thereby reducing the circuit area.

Another embodiment of the present invention relates to a disk apparatus. The disk apparatus includes: a spindle motor which rotates a disk; and the aforementioned motor driving circuit which drives the spindle motor.

With such an embodiment, the period of time in which the switching circuit connected to the coil of the motor is maintained in the high impedance state can be set to as short a period of time as possible. This reduces the period of time in which the current flows through the coil of the motor in a discontinuous waveform. Thus, such an arrangement reduces the noise produced by the spindle motor.

Yet another embodiment according to the present invention relates to a method. The method comprises: back electromotive force detection in which a zero-crossing point is detected by comparing a back electromotive force that occurs in at least one coil of the multi-phase motor with a center tap voltage at a common node of the coils, and a back electromotive force detection signal is output; adjusting a current that flows through the coils of the multi-phase motor by applying a voltage at a high level or a low level to one terminal of each coil of the multi-phase motor according to the back electromotive force detection signal; and setting a circuit connected to the coil to a high-impedance state during a period of time, which is obtained by multiplying the cycle of the back electromotive force detection signal by a predetermined coefficient, before the detection of the zero-crossing point in the back electromotive force detection.

2. An embodiment according to the present invention relates to a motor driving circuit which drives a multi-phase motor by supplying a driving current to the multi-phase motor. The motor driving circuit comprises: multiple switching circuits each of which is provided for a corresponding coil of the multi-phase motor, and each of which applies a high-level voltage or a low-level voltage to one terminal of the coil connected to the switching circuit; a pulse modulated signal generating circuit which generates a pulse modulated signal a duty ratio of which changes according to at least a target torque of the multi-phase motor; a back electromotive force detection circuit which detects a zero-crossing point by making a comparison between a back electromotive force which occurs in at least one coil of the multi-phase motor and a center tap voltage at a common node of the coils, and outputs a back electromotive force detection signal; and a switching control circuit which receives the pulse modulated signal from the pulse modulated signal generating circuit and the back electromotive force detection signal from the back electromotive force detection circuit, and which controls a sequence of the ON/OFF state of the multiple switching circuits based upon the back electromotive force detection signal, and which controls the switching operation of at least one of a high-side switch and a low-side switch included in the multiple switching circuits. With such an arrangement, the back electromotive force detection circuit sets a detection timing based upon the pulse modulated signal from the pulse modulated signal generating circuit. Furthermore, when the comparison result between the back electromotive force and the center tap voltage satisfies a predetermined condition at the detection timing thus set, the back electromotive force detection circuit may output the back electromotive force detection signal at a predetermined level.

With such an embodiment, the detection timing for the zero-crossing point can be set synchronously with the pulse modulated signal, which is the source of a noise component in the back electromotive force, thereby setting the detection timing to a period of time in which the effect of noise is small. Such an arrangement prevents false detection of the zero-crossing point. The term "pulse modulation" as used here represents modulation using a signal having an adjustable ratio of the period in which the pulse is in the high level state to the period in which the pulse is in the low level state, i.e., an adjustable duty ratio. Examples of pulse modulation include pulse width modulation, pulse frequency modulation, pulse position modulation, etc.

The back electromotive force detection circuit may set the detection timing based upon the timing of the level transition of the pulse modulated signal. With such an arrangement, the timing of the edge of the pulse modulated signal, or the timing delayed from the edge by a predetermined period of time, may be set to be the detection timing.

The back electromotive force detection circuit may set the timing at which the level of the pulse modulated signal transits from the level that corresponds to the ON state of the switches included in the multiple switching circuits to the level that corresponds to the OFF state thereof to be the detection timing. In many cases, the noise component, which occurs in the back electromotive force due to the pulse modulation, reaches approximately its maximum immediately after the transition of the ON/OFF state occurs with respect to the switches connected to the coils other than the coil in which the back electromotive force to be detected occurs. Subsequently, in many cases, damping occurs. Accordingly, with such an arrangement, the timing immediately before the transition in the ON/OFF operation of the switches is assigned to be the detection timing, thereby allowing the zero-crossing point to be detected in the state in which the noise component is small.

When the comparison result of which of the back electromotive force and the center tap voltage is the greater satisfies a predetermined condition at the detection timing, the back electromotive force detection circuit may output the back electromotive force detection signal. The predetermined condition, i.e., the condition in which the back electromotive force is greater than the center tap voltage, or the condition in which the back electromotive force is smaller than the center tap voltage, should be set according to the driving state of the motor.

The back electromotive force detection circuit may include: a comparator which compares the back electromotive force with the center tap voltage; and a comparison value output unit which receives the output signal of the comparator, and outputs the value at the detection timing. The comparison value output unit may be a latch circuit which latches the output signal of the comparator according to the pulse modulated signal.

The motor driving circuit may be monolithically integrated on a single semiconductor substrate. With such an arrangement, the motor driving circuit is monolithically integrated as a single LSI, thereby reducing the circuit area.

Another embodiment according to the present invention relates to a disk apparatus. The disk apparatus includes: a spindle motor which rotates a disk; and the aforementioned motor driving circuit which drives the spindle motor.

Such an embodiment suitably prevents the motor driving circuit from making a false detection of the zero-crossing point. This provides stable rotation of the spindle motor.

Yet another embodiment according to the present invention relates to a motor driving method for supplying a driving current to a multi-phase motor so as to drive the multi-phase motor. The motor driving method comprises: generating a pulse modulated signal a duty ratio of which changes according to at least the target torque of the multi-phase motor; back electromotive force detection in which a zero-crossing point is detected by comparing a back electromotive force that occurs in at least one coil of the multi-phase motor with a center tap voltage at a common node of the coils, and a back electromotive force detection signal is output at a predetermined level; controlling a sequence of the coils to be driven based upon the back electromotive force detection signal; applying a switching signal at a high level or a low level to the coils to be driven based upon the pulse modulated signal. With such an arrangement, in the back electromotive force detection, a detection timing is set based upon the pulse modulated signal. When the comparison result between the back electromotive force and the center tap voltage satisfies a predetermined condition at the detection timing thus set, the back electromotive force detection signal is set to the predetermined level.

With such an embodiment, the detection timing for the zero-crossing point can be set synchronously with the pulse modulated signal, which is the source of a noise component in the back electromotive force, thereby setting the detection timing to a period of time in which the effect of noise is small. This prevents false detection of the zero-crossing point.

3. An embodiment according to the present invention relates to a motor driving circuit which drives a multi-phase motor by supplying a driving current to the multi-phase motor. The motor driving circuit comprises: multiple switching circuits each of which is provided for a corresponding coil of the multi-phase motor, and each of which applies a high-level voltage or a low-level voltage to one terminal of the coil connected to the switching circuit; a back electromotive force detection circuit which detects a zero-crossing point by making a comparison between a back electromotive force which occurs in at least one coil of the multi-phase motor and a center tap voltage at a common node of the coils, and outputs a back electromotive force detection signal at a predetermined level; a pulse signal generating circuit which receives the back electromotive force detection signal, and generates a pulse signal, with a frequency which is obtained by multiplying that of the back electromotive force detection signal by n (n is an integer which is equal to or greater than 2), synchronously with the back electromotive force detection signal; a sine wave signal generating circuit which receives the pulse signal from the pulse signal generating circuit, and outputs a control signal in the shape of a sine wave according to the pulse signal; a pulse modulated signal generating circuit which generates a pulse modulated signal subjected to pulse modulation by synthesizing the control signal output from the sine wave signal generating circuit and a torque signal which is an instruction signal for setting the target torque of the multi-phase motor; and a switching control circuit which receives the back electromotive force detection signal from the back electromotive force detection circuit and the pulse modulated signal from the pulse modulated signal generating circuit, and which controls a sequence of the ON/OFF state of the multiple switching circuits based upon the back electromotive force detection signal, and which controls the switching operation of at least one of a high-side switch and a low-side switch included in the multiple switching circuits.

With such an embodiment, a pulse signal is generated synchronously with the back electromotive force detection signal, and a control signal in the shape of a sine wave is generated according to the pulse signal so as to execute pulse modulation. Thus, such an embodiment provides suitable sine-wave driving operation according to the rotational state. The term "pulse modulation" as used here represents modulation using a signal having an adjustable ratio of the period in which the pulse is in the high level state to the period in which the pulse is in the low level state, i.e., an adjustable duty ratio. Examples of pulse modulation include pulse width modulation, pulse frequency modulation, pulse position modulation, etc. The term "in the shape of a sine wave" as used in the present specification is a concept which encompasses other waveforms such as a trapezoidal-shaped waveforms, etc., in which the coil current is gradually changed, in addition to sine waves.

The sine wave signal generating circuit may include a storage unit which holds the control signal in the shape of a sine wave. Furthermore, the sine wave signal generating circuit may sequentially read out and output the control signal in the shape of a sine wave according to the pulse signal. With such an arrangement, the frequency of the control signal in the shape of a sine wave can be generated proportional to the frequency of the pulse signal with high precision.

The pulse modulated signal generating circuit may include: a synthesizing unit which outputs a composite signal obtained by multiplying the control signal by the torque signal; and a pulse modulator which compares the composite signal output from the synthesizing unit with a predetermined cycle signal, and which generates a pulse modulated signal a duty ratio of which changes according to the comparison result of which of the composite signal and the predetermined cycle signal is the greater.

The pulse signal generating circuit may include: a frequency counter which measures the frequency of the back electromotive force detection signal; a clock signal generating circuit which generates a pulse signal with a frequency n (n is an integer which is equal to or greater than 2) times that of the frequency measured by the frequency counter.

The clock signal generating unit may perform computation on the past K (K is an integer which is equal to or greater than 1) frequency values measured by the frequency counter, and may set the frequency of the pulse signal to be generated based upon the computation results.

The clock signal generating unit may include an adjustment means which allows the integer K to be adjusted. With such an arrangement, the gain of the feedback loop is increased according to the reduction in the integer K. In this case, such an arrangement is capable of being highly responsive to the change in the revolution of the motor. On the other hand, the gain of the feedback loop is reduced according to the increase in the integer K. In this case, such an arrangement allows the stability of the loop to be increased. Thus, such an arrangement provides optimum driving operation of the motor by setting the value of the integer K according to the kind of motor, the revolution thereof, and the driving method thereof.

The pulse signal generating circuit may further include: a storage unit which holds the past L (L is an integer which is equal to or greater than K) frequency values; and a computation unit which performs the predetermined computation based upon the frequency values held by the storage unit. Also, the clock signal generating unit may generate a pulse signal with a frequency according to the computation results obtained by the computation unit. Also, the storage unit may be an L-stage shift register.

The computation unit may perform computation on the latest K frequency values from among the L frequency values held by the storage unit so as to determine the frequency of the pulse signal.

A motor driving circuit according to an embodiment may further include a window signal generating circuit configured such that the window signal generating circuit receives the back electromotive force from the back electromotive force detection circuit and the pulse signal from the pulse signal generating circuit, and when the window signal generating circuit detects m (m is an integer which is smaller than n) pulses of the pulse signal after the detection of a back electromotive force detection signal, the window signal generating circuit outputs a window signal at a predetermined level, following which, when the window signal generating circuit detects the next back electromotive force detection signal, the window signal generating circuit outputs the window signal at a level that differs from the predetermined level. With such an arrangement, the switching control circuit may receive the window signal from the window signal generating circuit. Furthermore, during a period in which the window signal is maintained at the predetermined level, the switching control circuit may stop the switching operation of the switching circuit connected to the coil to be monitored by the back electromotive force detection circuit with respect to the back electromotive force, thereby setting the switching circuit to the high-impedance state.

With such an arrangement, the non-driving period, in which the switching circuit connected to the coil which is a detection target with respect to the back electromotive force is maintained in the high-impedance state for the detection of the zero-crossing point, is set using the pulse signal generated for the sine-wave driving operation. Thus, such an arrangement allows the non-driving period to be set synchronously with the sine-wave driving operation.

The window signal generating circuit may include an adjustment means which allows the integer m to be adjusted. With such an arrangement, the integer m can be changed according to the kind of motor connected to the motor driving circuit, etc. Thus, such an arrangement provides stable motor driving operation.

The window signal generating circuit may include: a counter configured such that the counter receives the back electromotive force detection signal output from the back electromotive force detection circuit and the pulse signal output from the pulse signal generating circuit, and when the counter counts m pulses of the pulse signal after the detection of a back electromotive force detection signal, the counter outputs an open edge signal at a predetermined level; and a window signal output unit configured such that, when the counter outputs the open edge signal at the predetermined level, the window signal output unit outputs the window signal at the predetermined level, following which, when the window signal output unit detects the next back electromotive force detection signal, the window signal output unit outputs the window signal at a level that differs from the predetermined level.

The motor driving circuit may be monolithically integrated on a single semiconductor substrate. With such an arrangement, the motor driving circuit is monolithically integrated as a single LSI, thereby reducing the circuit area.

Another embodiment according to the present invention relates to a disk apparatus. The disk apparatus includes: a spindle motor which rotates a disk; and the aforementioned motor driving circuit which drives the spindle motor.

With the disk apparatus according to this embodiment, the current that flows through the coil can be controlled synchronously with the rotation of the spindle motor.

Yet another embodiment according to the present invention relates to a motor driving method for supplying a driving current to a multi-phase motor so as to drive the multi-phase motor. The motor driving method comprises: detecting a zero-crossing point by comparing a back electromotive force that occurs in at least one coil of the multi-phase motor with a center tap voltage at a common node of the coils, and generating a back electromotive force detection signal at a predetermined level; generating a pulse signal with a frequency n (n is an integer which is equal to or greater than 2) times that of the frequency of the back electromotive force detection signal, synchronously with the back electromotive force detection signal; generating a control signal in the shape of a sine wave according to the pulse signal; generating a pulse modulated signal subjected to pulse modulation by synthesizing the control signal and a torque signal which is an instruction signal for setting the target torque of the multi-phase motor; and controlling a sequence of the coils to be driven based upon the back electromotive force detection signal, and applying a switching signal at a high level or a low level to the coils to be driven based upon the pulse modulated signal.

The driving method according to this embodiment provides suitable sine-wave driving operation according to the rotational state.

A motor driving method according to an embodiment may further include: generation of a window signal in which, when m (m is an integer which is smaller than n) pulses of the pulse signal are detected after the detection of a back electromotive force detection signal, the window signal is generated at a predetermined level, following which, when the next back electromotive force detection signal is detected, the window signal is generated at a level that differs from the predetermined level; and setting a switching circuit, which is connected to a coil to be monitored with respect to the back electromotive force for detecting the zero-crossing point, to a high-impedance state during a period in which the window signal is maintained at the predetermined level.

With this driving method, the non-driving period, in which the switching circuit connected to the coil which is a detection target with respect to the back electromotive force is maintained in the high-impedance state, is set using a pulse signal generated for the sine-wave driving operation. Thus, such a driving method allows the non-driving period to be set synchronously with the sine-wave driving operation.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A through 4L are time charts which show the operation of the motor driving circuit according to the embodiment;

FIGS. 5A through 5D are time charts which show steps for generating a window signal WINDOW;

FIGS. 10A through 10L are time charts which show the operation of the motor driving circuit according to the second embodiment;

FIGS. 11A through 11E are waveform diagrams which show steps for detecting a zero-crossing point in the motor driving circuit according to the second embodiment;

FIGS. 16A through 16L are time charts which show the operation of the motor driving circuit according to the present embodiment; and FIGS. 17A through 17E are time charts which show steps for generating a window signal WINDOW and a sine-wave-shaped control signal CNT.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
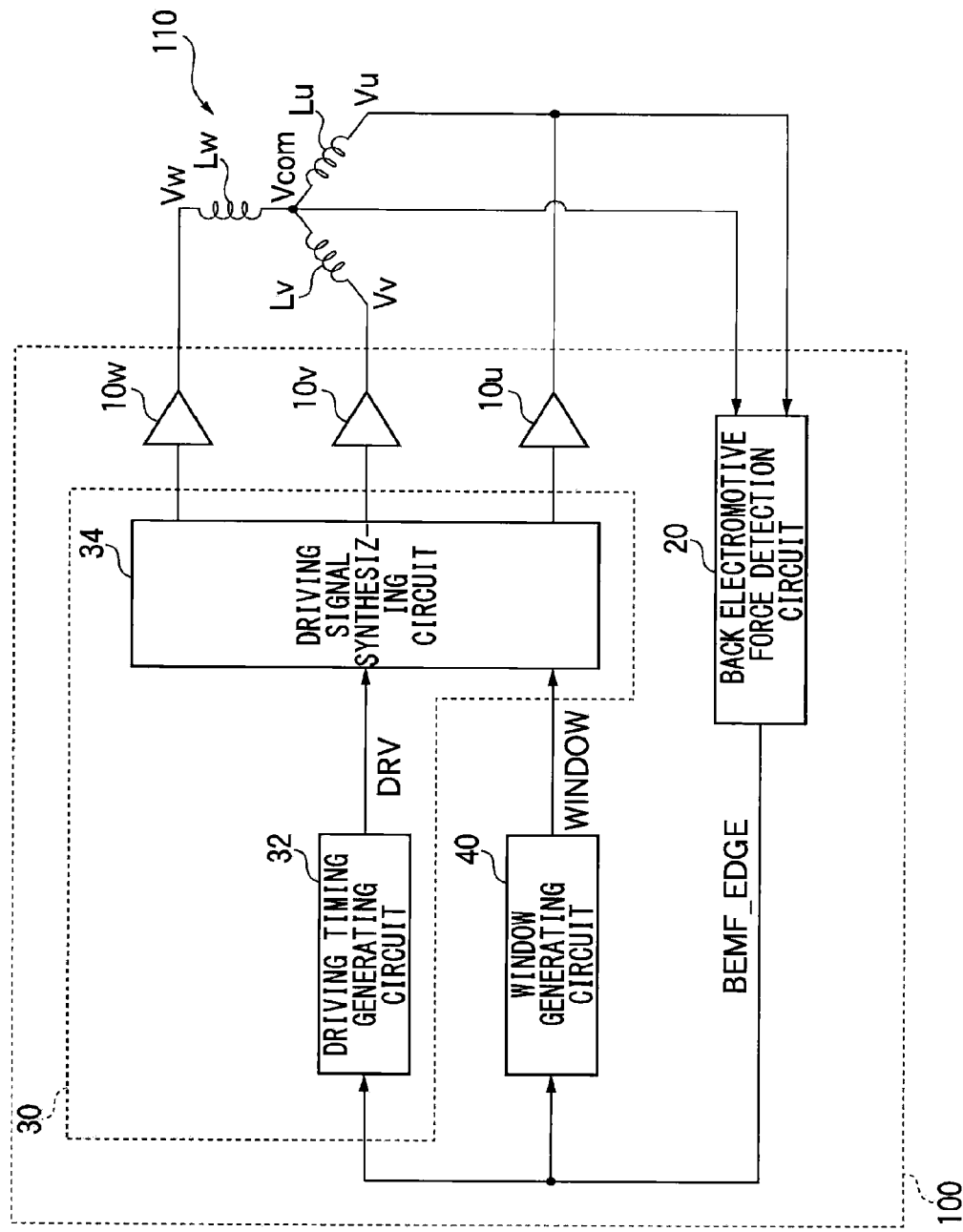
FIG. 1 is a block diagram which shows a configuration of a motor driving circuit according to a first embodiment.

FIG. 1 is a block diagram which shows a configuration of a motor driving circuit 100 according to a first embodiment of the present invention. The motor driving circuit 100 controls the rotation of a sensor-less brushless DC motor (which will simply be referred to as the "motor 110" hereafter) by supplying a driving current to the motor. With the present embodiment, the motor 110, which is a driving target, is a three-phase DC motor including a U-phase coil Lu, a V-phase coil Lv, and a W-phase coil Lw.

The motor driving circuit 100 includes: switching circuits 10u, 10v, and 10w, which are collectively referred to as the "switching circuit(s) 10"; a back electromotive force detection circuit 20; a switching control circuit 30; and a window generating circuit 40. The motor driving circuit 100 is monolithically integrated on a single semiconductor substrate as a functional IC. For example, the motor driving circuit 100 performs PWM (Pulse Width Modulation) driving operation using the 180 degree conduction method such that the current passes through each phase coil in the shape of an arch-shaped waveform or a sine wave.

The switching circuits 10u, 10v, and 10w are provided to the coils Lu, Lv, and Lw of the motor 110, respectively. Each of the switching circuits 10u, 10v, and 10w has a configuration including a high-side switch and a low-side switch connected in series between the power supply voltage and the ground potential. With such an arrangement, the connection node of these two switches is connected to the coil. The driving signal DRV_H (U, V, or W) and the driving signal DRV_L (U, V, or W) are input to the control terminals of the high-side switch and the low-side switch, respectively. When the high-side switch is in the ON state, each of the switching circuits 10u, 10v, and 10w applies the high-level voltage to one terminal of the coil thus connected. When the low-side switch is in the ON state, each of the switching circuits 10u, 10v, and 10w applies the low-level voltage to one terminal of the coil thus connected. In addition, when the high-side switch and the low-side switch are set to the OFF state at the same time, the coil is set to the high-impedance state.

The back electromotive force detection circuit 20 detects the zero-crossing point by making a comparison between the back electromotive force that occurs in at least one coil included in the motor 110 and the voltage at the center tap of the coils, and outputs the back electromotive force detection signal BEMF_EDGE. With the present embodiment, the back electromotive force detection circuit 20 monitors the back electromotive force Vu that occurs in the U-phase coil Lu and the center tap voltage Vcom. When the Vu is greater than the Vcom, the back electromotive force detection circuit 20 generates the back electromotive force detection signal BEMF_EDGE in the high-level state. The back electromotive force detection signal BEMF_EDGE thus generated is output to the switching control circuit 30 and the window generating circuit 40.

The switching control circuit 30 controls the ON/OFF state sequence for the multiple switching circuits 10u, 10v, and 10w, i.e., controls the switching state thereof based upon the back electromotive force detection signal BEMF_EDGE output from the back electromotive force detection circuit 20, thereby controlling the current that flows through the coils of the motor 110. The switching control circuit 30 includes a driving timing generating circuit 32 and a driving signal synthesizing circuit 34.

The driving timing generating circuit 32 receives the back electromotive force detection signal BEMF_EDGE as an input signal. The driving timing generating circuit 32 generates a driving signal DRV with a cycle ⅙ that of the cycle Tp1 of the back electromotive force detection signal BEMF_EDGE. The driving signal synthesizing circuit 34 controls the driving state of each of the switching circuits 10u, 10v, and 10w according to the driving signal DRV. For example, the driving signal synthesizing circuit 34 generates a composite signal of a pulse signal obtained by performing the pulse width modulation on a sine wave signal and the driving signal DRV, and outputs the composite signal thus obtained to the switching circuits 10u, 10v, and 10w.

Before the detection of the zero-crossing point by the back electromotive force detection circuit 20, the window generating circuit 40 outputs a window signal WINDOW at a predetermined level during a period of time (Tp3=Tp1×α) obtained by multiplying the cycle Tp1 of the back electromotive force detection signal BEMF_EDGE thus output from the back electromotive force detection circuit 20 by a predetermined coefficient α (α is a real number which is greater than 0, and is smaller than 1). With the present embodiment, a predetermined level is set to the high level.

The window generating circuit 40 receives the back electromotive force detection signal BEMF_EDGE as an input signal. The window generating circuit 40 sets the window signal WINDOW to the high-level state after the period of time, which is obtained by multiplying the back electromotive force detection signal BEMF_EDGE by a coefficient (1−α), from the point in time at which a back electromotive force detection signal BEMF_EDGE is output. Subsequently, when the back electromotive force detection circuit 20 outputs the next back electromotive force detection signal BEMF_EDGE, the window generating circuit 40 sets the window signal WINDOW to a level that differs from the predetermined level, i.e., the low level.

The window signal WINDOW is output to the driving signal synthesizing circuit 34 of the switching control circuit 30. The driving signal synthesizing circuit 34 stops the switching of the switching circuit 10u connected to the terminal, in which the back electromotive force Vu to be monitored for the detection of the zero-crossing point occurs, during a period of time in which the window signal WINDOW is in the high-level state. This sets the terminal to the high-impedance state. That is to say, during a period of time in which the window signal WINDOW is in the high-level state, in order to detect the zero-crossing point, a particular phase is intentionally set to the non-driving phase. With the present embodiment, during the non-driving period Tp3, the U phase is set to the non-driving phase.

Figure 2:
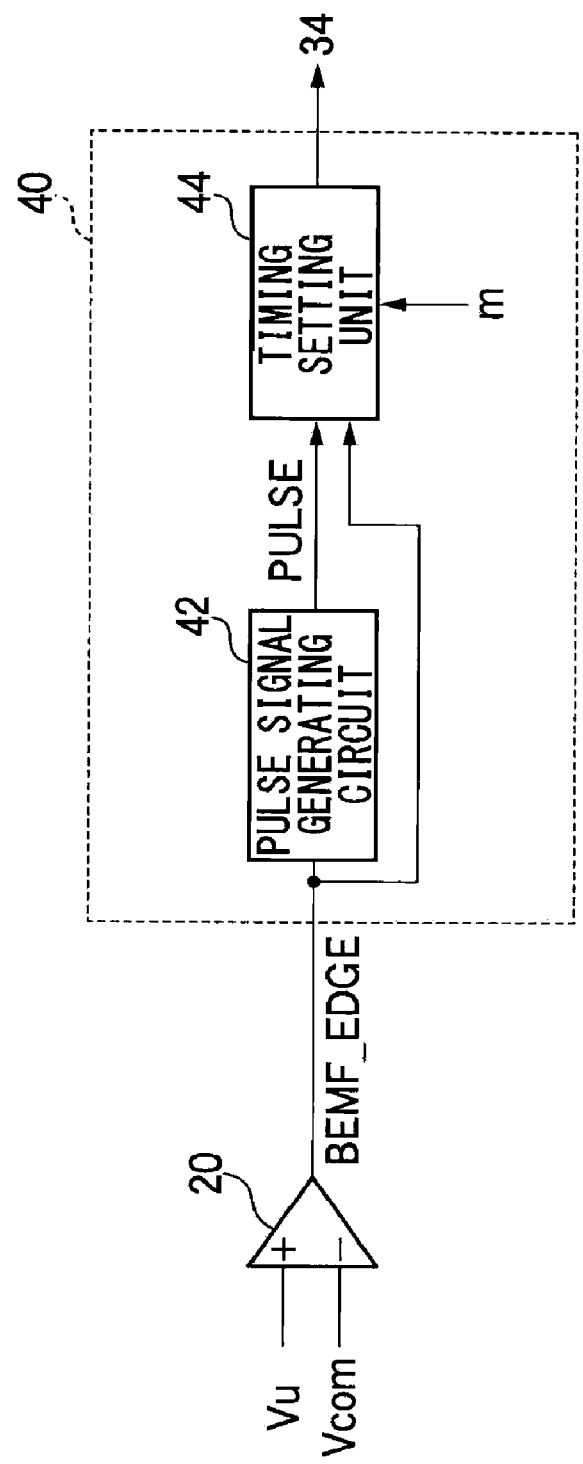
FIG. 2 is a block diagram which shows an example of the configuration of a part of the motor driving circuit.

FIG. 2 is a block diagram which shows an example of a part of the configuration of the motor driving circuit 100. The back electromotive force detection circuit 20 is a comparator, which compares the back electromotive force Vu that occurs in the coil Lu with the center tap voltage Vcom. When the Vu is greater than the Vcom, the back electromotive force detection circuit 20 outputs a high-level signal. On the other hand, when Vu is smaller than Vcom, the back electromotive force detection circuit 20 outputs a low-level signal.

The window generating circuit 40 includes a pulse signal generating circuit 42 and a timing setting unit 44. Upon reception of the back electromotive force detection signal BEMF_EDGE output from the back electromotive force detection circuit 20, the pulse signal generating circuit 42 generates a pulse signal with a cycle n (n is an integer which is equal to or greater than 2) times that of the back electromotive force detection signal BEMF_EDGE.

The timing setting unit 44 receives the back electromotive force detection signal BEMF_EDGE from the back electromotive force detection circuit 20 and the pulse signal PULSE from the pulse signal generating circuit 42. When the timing setting unit 44 counts in (m is an integer which is smaller than n) pulse signals PULSE after the detection of a back electromotive force detection signal BEMF_EDGE, the timing setting unit 44 sets the window signal WINDOW to the high-level state. Subsequently, upon detection of the next back electromotive force detection signal BEMF_EDGE, the timing setting unit 44 sets the window signal WINDOW to the low-level state.

The integer m is preferably adjustable. For example, the motor driving circuit 100 may include a register which holds the integer m, and may have a configuration which allows the integer m to be externally set.

Figure 3:
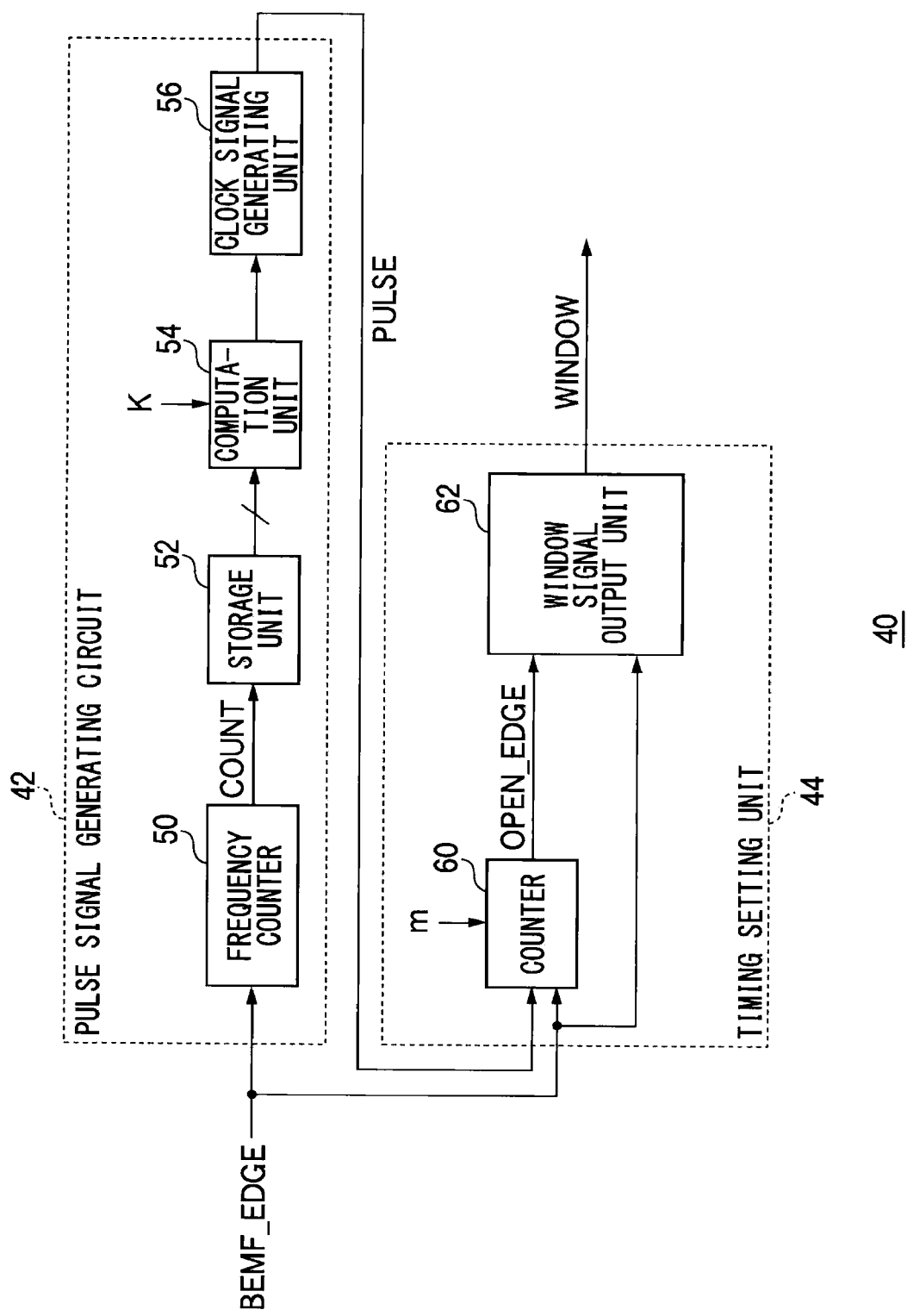
FIG. 3 is a block diagram which shows a configuration example of a pulse signal generating circuit and a timing setting unit.

FIG. 3 is a block diagram which shows an example of the configurations of the pulse signal generating circuit and the timing setting unit 44. The pulse signal generating circuit 42 includes a frequency counter 50 and a clock signal generating unit 56.

The frequency counter 50 measures the frequency of the back electromotive force detection signal BEMF_EDGE, i.e., the cycle Tp1. For example, the frequency counter 50 receives a clock signal (not shown) at a predetermined frequency as an input signal. The frequency counter 50 counts the pulses of the clock signal during a period of time from the point in time at which a back electromotive force detection signal BEMF_EDGE is input up to the point in time at which the next back electromotive force detection signal BEMF_EDGE is input, thereby measuring the cycle Tp1 of the back electromotive force detection signal BEMF_EDGE. The frequency counter 50 sequentially outputs the count value COUNT as a frequency value.

The clock signal generating unit 56 generates the pulse signal PULSE with a frequency n (n is an integer which is equal to or greater than 2) times that of the frequency thus measured by the frequency counter 50. That is to say, the cycle Tp2 of the pulse signal PULSE is set to 1/n that of the cycle Tp1 of the back electromotive force detection signal BEMF_EDGE.

The clock signal generating unit 56 performs computation on the past k (k is an integer which is equal to or greater than 1) frequency values COUNT thus measured by the frequency counter 50. Furthermore, based upon the computation results, the clock signal generating unit 56 sets the frequency of the pulse signal to be generated. The integer K, which corresponds to the number of frequency values to be set to be the computation targets, is preferably an adjustable value.

In order to provide this function, the pulse signal generating circuit 42 includes a storage unit 52 and a computation unit 54, which are components provided upstream of the clock signal generating unit 56. The storage unit 52 holds the past L (L is an integer which is equal to or greater than K) frequency values COUNT. For example, the storage unit 52 may be an L-stage shift register. The computation unit 54 executes predetermined computation based upon the frequency values thus held by the storage unit 52. In the computation processing, simple averaging or weighted averaging may be performed.

The clock signal generating unit 56 generates the pulse signal PULSE with a frequency determined based upon the computation results obtained by the computation unit 54. For example, the computation unit 54 performs computation on the latest K frequency values from among the L frequency values held by the storage unit 52, so as to determined the frequency of the pulse signal PULSE. In the computation processing, the K count values may be subjected to simple averaging or weighted averaging. As described above, the integer K is preferably an adjustable value. Furthermore, an arrangement is preferably made which allows the integer K to be externally set. In a case of K=1, the cycle Tp2 of the pulse signal PULSE is set based upon the cycle Tp1 of the back electromotive force detection signal BEMF_EDGE obtained just before.

The timing setting unit 44 receives the back electromotive force detection signal BEMF_EDGE output from the back electromotive force detection circuit 20 and the pulse signal PULSE output from the pulse signal generating circuit 42. The timing setting unit 44 includes a counter 60 and a window signal output unit 62. When the counter 60 counts m pulses of the pulse signals PULSE after the detection of a back electromotive force detection signal BEMF_EDGE, the counter 60 outputs an open edge signal OPEN_EDGE at the high level. When the counter 60 outputs the open edge signal OPEN_EDGE at the high level, the window signal output unit 62 outputs a window signal WINDOW at the high level. Subsequently, when the next back electromotive force detection signal BEMF_EDGE is detected, the window signal output unit 62 outputs the window signal WINDOW at the low level.

Description will be made regarding the operation of the motor driving circuit 100 thus configured. FIGS. 4A through 4L are time charts which show the operation of the motor driving circuit 100 according to the embodiment. The vertical axis and the horizontal axis in FIGS. 4A through 4L are expanded or reduced as appropriate in order to facilitate understanding. Furthermore, simple waveforms are shown in the drawings in order to facilitate understanding. FIGS. 4A through 4C show the waveforms that represent the driving states of the U-phase coil Lu, the V-phase coil Lv, and the W-phase coil Lw controlled by the switching circuits 10u, 10v, and 10w, respectively. FIG. 4D shows the back electromotive force detection signal BEMF_EDGE detected by the back electromotive force detection circuit 20. FIG. 4E shows the driving signal DRV generated by the driving timing generating circuit 32. FIG. 4F shows the window signal WINDOW generated by the window generating circuit 40. Furthermore, FIGS. 4G through 4L show the driving signals DRV_H and DRV_L for the high-side switches and the low-side switches of the switching circuits 10u through 10w.

As shown in FIGS. 4A through 4C, the present embodiment is driven such that the driving current is supplied in the shape of an arch-shaped waveform. It is needless to say that the present invention is not restricted to such an arrangement. Also, the driving current may be supplied in the shape of a sine wave. With the present embodiment, as shown in FIG. 4D, the back electromotive force detection signal BEMF_EDGE is generated at every zero-crossing point at which the back electromotive force Vu crosses the center tap voltage Vcom. The driving timing generating circuit 32 generates the driving signal DRV shown in FIG. 4E with a cycle which is ⅙ that of the cycle Tp1 of the back electromotive force detection signal BEMF_EDGE. The driving signal DRV may be generated with a delay Td with respect to the back electromotive force detection signal BEMF_EDGE, as shown in the drawing. The adjustment of the delay Td allows the driving of the motor to be optimized.

The driving signal synthesizing circuit 34 generates the driving signals DRV_H (U, V, W) and DRV_L (U, V, W), which are used for controlling the ON/OFF operations of the switching circuits 10u through 10w, based upon the driving signal DRV generated by the driving timing generating circuit 32. The driving sequence is set appropriately according to the conduction angle etc.

With regard to the driving signal DRV_HU shown in FIG. 4G, the high-level state thereof corresponds to the ON state of the high-side switch of the switching circuit 10u. On the other hand, the low-level state thereof corresponds to the OFF state of the high-side switch of the switching circuit 10u. The same can be said of the other driving signals shown in FIGS. 4H through 4L, i.e., the driving signals DRV_H (V, W) and DRV_L (U, V, W). Furthermore, at least one ON state of the high-side switch and the low-side switch is subjected to pulse-width modulation so as to provide the driving waveforms shown in FIGS. 4A through 4C. Accordingly, either the high-side switch of each of the switching circuits 10u through 10w or the low-side switch thereof is repeatedly switched between the ON state and the OFF state at a high frequency.

The driving signal synthesizing circuit 34 switches the driving signals DRV_H and DRV_L for the switching circuits 10u through 10w according to a predetermined driving sequence every time the back electromotive force detection signal BEMF_EDGE is output.

Before the point in time at which the zero-crossing point occurs, the window signal WINDOW shown in FIG. 4F is set to the high-level state by the window generating circuit 40. During a period of time in which the window generating circuit 40 maintains the high-level signal, the driving signal synthesizing circuit 34 maintains the driving signals DRV_HU and DRV_LU, to be output to the switching circuit 10u, at the low level. This turns off the high-side switch and the low-side switch, thereby switching the state to the high impedance state. The period of time in which the state is set to the high impedance state for the detection of the zero-crossing point is indicated by the hatched areas in FIGS. 4G and 4I. When the window signal WINDOW is set to the high-level state, one terminal of the coil Lu is set to the high-impedance state. In this stage, the zero-crossing point can be detected, and the back electromotive force detection signal BEMF_EDGE is generated. When the back electromotive force detection signal BEMF_EDGE becomes the high-level state, the window generating circuit 40 sets the window signal WINDOW to the low-level state.

FIGS. 5A through 5D are time charts which show steps for generating the window signal WINDOW. FIG. 5A shows the back electromotive force detection signal BEMF_EDGE. FIG. 5B shows the pulse signal PULSE generated by the pulse signal generating circuit 42. FIG. 5C shows the open edge signal OPEN_EDGE generated by the counter 60. FIG. 5D shows the window signal WINDOW.

When the back electromotive force detection signal BEMF_EDGE becomes the high-level state, the frequency counter 50 shown in FIG. 3 starts counting processing. Then, the frequency counter 50 outputs the count value COUNT, which has been counted up to a point in time at which the back electromotive force detection signal BEMF_EDGE next becomes the high-level state, to the storage unit 52. The storage unit 52 holds at least the past one count value COUNT. With the clock cycle used for the counting processing in the frequency counter 50 as Tck, the cycle Tp1 of the back electromotive force detection signal BEMF_EDGE is represented by Tck×COUNT. The computation unit 54 determines the cycle Tp2 of the pulse signal PULSE using the past k count values such that the expression Tp2=Tp1/n is satisfied. As a result, as shown in FIG. 5B, the cycle Tp2 of the pulse signal PULSE output from the pulse signal generating circuit 42 is 1/n that of the cycle Tp1 of the back electromotive force detection signal BEMF_EDGE.

When the back electromotive force detection signal BEMF_EDGE becomes the high-level state at the point in time t0, the counter 60 shown in FIG. 3 starts to count the pulses of the pulse signal PULSE output from the pulse signal generating circuit 42. When the counter 60 counts m pulses of the pulse signals PULSE, the counter 60 outputs the open edge signal OPEN_EDGE at the high level.

The window signal output unit 62 maintains the window signal WINDOW at the high level during a period of time from the point in time t1 at which the open edge signal OPEN_EDGE becomes the high-level state up to the point in time t2 at which the back electromotive force detection signal BEMF_EDGE next becomes the high-level state.

As described above, the motor driving circuit 100 according to the present embodiment generates the window signal WINDOW at the high level during a period of time obtained by multiplying the cycle Tp1 of the back electromotive force detection signal BEMF_EDGE output from the back electromotive force detection circuit 20 by a predetermined coefficient (1−m/n) before the detection of the zero-crossing point. The period of time, in which the window signal WINDOW is maintained at the high level, is set to the non-driving period of time Tp3 for the detection of the zero-crossing point. As a result, the non-driving period Tp3 can be adjusted and set according to the revolution of the motor. With conventional arrangements in which the non-driving period is set to a fixed value, there is a need to set the non-driving period to a long period of time beforehand. On the other hand, with the present embodiment, there is no need to set the non-driving period to such a long time beyond what is necessary. This provides smooth driving current for the motor, thereby reducing the noise produced by the motor.

Furthermore, the window generating circuit 40 sets the window signal WINDOW to the high-level state after the elapse of a period of time (Tp2×m), which is obtained by multiplying the cycle Tp1 of the back electromotive force detection signal BEMF_EDGE by a coefficient (1−m/n), from the point in time at which a back electromotive force detection signal BEMF_EDGE is output. Subsequently, when the back electromotive force detection circuit 20 outputs the next back electromotive force detection signal BEMF_EDGE, the window generating circuit 40 sets the window signal WINDOW to the low-level state. As a result, before the detection of the zero-crossing point, such an arrangement allows the timing, at which the state of the switching circuit 10u is to be set to the high impedance state, to be set in a sure manner.

Furthermore, with the present embodiment, the timing setting unit 44 has a function of adjusting the number m of the pulse signals PULSE to be counted. Thus, such an arrangement allows the length of the non-driving period Tp3 to be changed according to the kind of motor to be driven etc. This provides stable driving of the motor.

Furthermore, with the present embodiment, the pulse signal generating circuit 42 has a function of adjusting the integer K. With such an arrangement, when the integer K is set to a small value, the gain of the feedback loop is increased. In this case, the response to the change in the revolution of the motor is increased. On the other hand, when the integer K is set to a large value, the gain of the feedback loop is reduced. In this case, the stability of the loop is increased. Thus, such an arrangement provides optimum driving of the motor by setting the value of K according to the kind, revolution, driving method of the motor.

Figure 6:
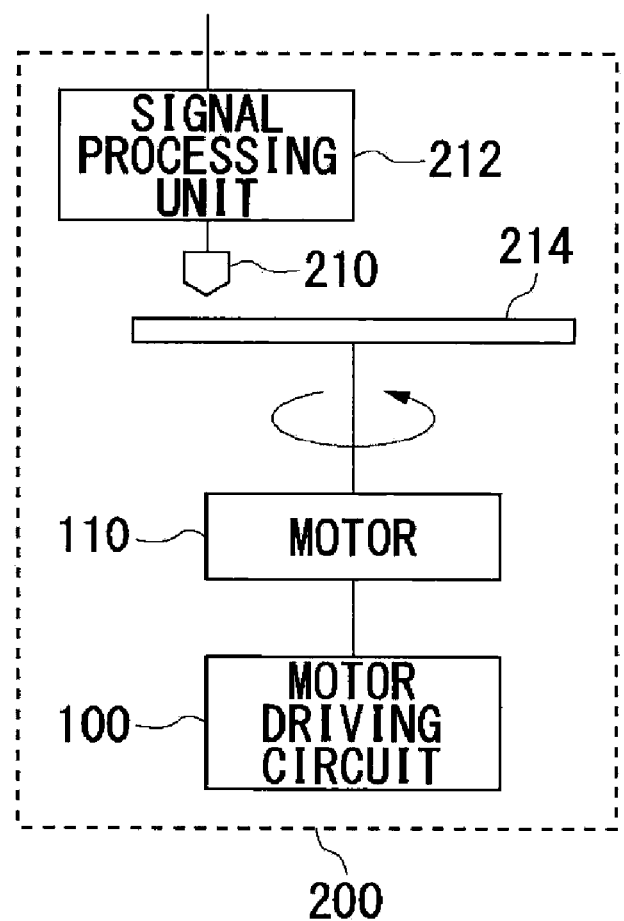
FIG. 6 is a block diagram which shows a disk apparatus mounting the motor driving circuit shown in FIG. 1, 8, or 12.

Next, description will be made regarding an example of an application of the motor driving circuit 100 according to the present embodiment. FIG. 6 is a block diagram which shows a configuration of the disk device 200 mounting the motor driving circuit 100 shown in FIG. 1. The disk device 200 is a unit which performs recording/reading processing on optical disks such as CDs and DVDs, and is mounted on an electronic apparatus such as a CD player, DVD player, personal computer, etc. The disk device 200 includes a pickup 210, a signal processing unit 212, a disk 214, the motor 110, and the motor driving circuit 100.

The pickup 210 writes desired data by emitting a laser beam to the disk 214. Also, the pickup 210 reads out the data, written on the disk 214, by reading the light reflected therefrom. The signal processing unit 212 performs necessary signal processing such as amplification processing, A/D conversion, D/A conversion, etc., on the data read or written by the pickup 210. The motor 110 is a spindle motor which is provided for rotating the disk 214. In particular, there is a demand for reducing the size of the disk device 200 as shown in FIG. 6. Accordingly, a sensor-less type motor, which includes no Hall element, is employed as the motor 110. The motor driving circuit 100 according to the present embodiment can be preferably used for stably driving such a sensor-less spindle motor.

Second Embodiment

Figure 8:
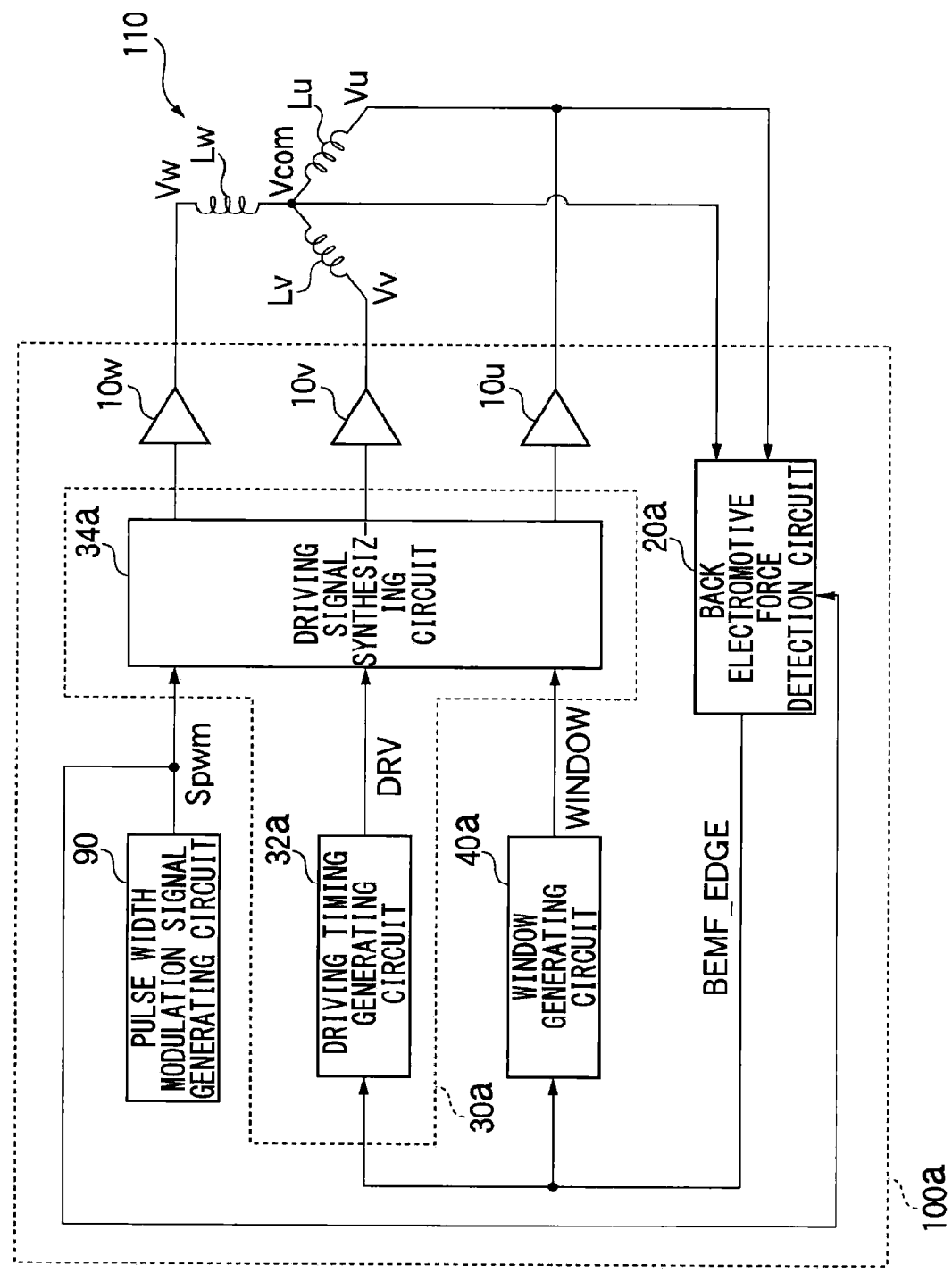
FIG. 8 is a block diagram which shows a configuration of a motor driving circuit according to a second embodiment.

FIG. 8 is a block diagram which shows a configuration of a motor driving circuit 100a according to a second embodiment. The motor driving circuit 100a controls the revolution of a sensor-less brushless DC motor (which will simply be referred to as the "motor 110" hereafter) by supplying a driving current to the motor 110. With the present embodiment, the motor 110, which is a driving target, is a three-phase DC motor including a U-phase coil Lu, a V-phase coil Lv, and a W-phase coil Lw.

The motor driving circuit 100a includes: switching circuits 10u, 10v, and 10w, which are collectively referred to as the "switching circuit(s) 10"; a back electromotive force detection circuit 20a, a switching control circuit 30a, a window generating circuit 40a, and a pulse width modulated signal generating circuit 90. The motor driving circuit 100a is monolithically integrated on a single semiconductor substrate as a functional IC. For example, the motor driving circuit 100a performs PWM (Pulse Width Modulation) driving operation using the 180 degree conduction method such that the current passes through each phase coil in the shape of an arch-shaped waveform or a sine wave.

The switching circuits 10u, 10v, and 10w are provided to the coils Lu, Lv, and Lw of the motor 110, respectively. Each of the switching circuits 10u, 10v, and 10w has a configuration including a high-side switch and a low-side switch connected in series between the power supply voltage and the ground potential. With such an arrangement, the connection node of these two switches is connected to the corresponding coil. The driving signal DRV_H (U, V, or W) and the driving signal DRV_L (U, V, or W) are input to the control terminals of the high-side switch and the low-side switch, respectively. When the high-side switch is in the ON state, each of the switching circuits 10u, 10v, and 10w applies the high-level voltage to one terminal of the coil thus connected. When the low-side switch is in the ON state, each of the switching circuits 10u, 10v, and 10w applies the low-level voltage to one terminal of the coil thus connected. In addition, when the high-side switch and the low-side switch are set to the OFF state at the same time, the coil is set to the high-impedance state.

The back electromotive force detection circuit 20a detects the zero-crossing point by making a comparison between the back electromotive force that occurs in at least one coil of the motor 110 and the voltage Vcom at the center tap of the coils, and outputs the back electromotive force detection signal BEMF_EDGE. With the present embodiment, the back electromotive force detection circuit 20a monitors the back electromotive force Vu that occurs in the U-phase coil Lu and the center tap voltage Vcom, and generates a back electromotive force detection signal BEMF_EDGE. The back electromotive force detection signal BEMF_EDGE thus generated is output to the switching control circuit 30a and the window generating circuit 40a. Detailed description will be made later regarding the back electromotive force detection circuit 20a.

The pulse width modulated signal generating circuit 90 generates a pulse width modulated signal (which will be referred to as the "PWM signal Spwm" hereafter), a duty ratio of which changes according to at least the target torque of the motor 110. The pulse width modulated signal generating circuit 90 makes a comparison between a cycle signal Sosc such as a triangular wave signal, saw-tooth wave signal, or the like, and the level of a torque instruction signal Strq. Then, the pulse width modulated signal generating circuit 90 changes the periods of time of the low-level state and the high-level state of the PWM signal Spwm according to the comparison result of which of these signals is the greater. It should be noted that the pulse width modulated signal generating circuit 90 may be configured in the form of either an analog circuit or a digital circuit.

In order to gradually change the coil current that flows through the coils Lu, Lv, and Lw, the pulse width modulated signal generating circuit 90 may generate the PWM signal Spwm by creating a composite signal of the target torque signal and a control wave signal provided in the form of a sine wave or an arch-shaped waveform.

The switching control circuit 30a receives the PWM signal Spwm from the pulse width modulated signal generating circuit 90 and the back electromotive force detection signal BEMF_EDGE from the back electromotive force detection circuit 20a. The switching control circuit 30a controls the ON/OFF state sequence for the multiple switching circuits 10u, 10v, and 10w based upon the back electromotive force detection signal BEMF_EDGE. Furthermore, the switching control circuit 30a controls the switching operation of at least one of the high-side switch and the low-side switch included in each of the multiple switching circuits 10u, 10v, and 10w.

The switching control circuit 30a includes a driving timing generating circuit 32a and a driving signal synthesizing circuit 34a. The driving timing generating circuit 32a receives the back electromotive force detection signal BEMF_EDGE as an input signal. The driving timing generating circuit 32a generates a driving signal DRV with a cycle ⅙ that of the cycle Tp1 of the back electromotive force detection signal BEMF_EDGE.

The driving signal synthesizing circuit 34a generates a composite signal of the driving signal DRV and the PWM signal Spwm, and outputs the driving signals DRV_H (u,v,w), and DRV_L (u,v,w), thereby controlling the states of the switching circuits 10u, 10v, and 10w.

Before the detection of the zero-crossing point by the back electromotive force detection circuit 20a, the window generating circuit 40a generates a window signal WINDOW, which stops the switching operation of the switching circuit 10u connected to the coil Lu which is the back electromotive force detection target, thereby setting the state to the high impedance state. With the present embodiment, the predetermined level is set to the high level. Let us consider an arrangement employing the 120 degree conduction method. With such an arrangement, there is a period of time in which no current flows through the coil Lu which is the back electromotive force detection target. Accordingly, with such an arrangement, the window generating circuit 40a may be omitted.

The window signal WINDOW is output to the driving signal synthesizing circuit 34a of the switching control circuit 30a. The driving signal synthesizing circuit 34a stops the switching of the switching circuit 10u connected to the terminal, in which the back electromotive force Vu to be monitored for the detection of the zero-crossing point occurs, during a period of time in which the window signal WINDOW is in the high-level state. This sets the terminal to the high-impedance state. That is to say, during a period of time in which the window signal WINDOW is in the high-level state, in order to detect the zero-crossing point, a particular phase is intentionally set to the non-driving phase. With the present embodiment, during the non-driving period Tp3, the U phase is set to the non-driving phase.

Next, detailed description will be made regarding the back electromotive force detection circuit 20a. The back electromotive force detection circuit 20a according to the present embodiment receives the PWM signal Spwm from the pulse width modulated signal generating circuit 90 as an input signal, in addition to the back electromotive force Vu and the center tap voltage Vcom. The back electromotive force detection circuit 20a sets the detection timing for detecting the zero-crossing point based upon the PWM signal Spwm. When the comparison result between the back electromotive force Vu and the center tap voltage Vcom satisfies a predetermined condition at the detection timing thus set, the back electromotive force detection circuit 20a outputs the back electromotive force detection signal BEMF_EDGE at the high level.

The back electromotive force detection circuit 20a sets the detection timing based upon the timing of the transition of the level of the PWM signal Spwm. Examples of the effective setting methods for setting the detection timing include: a method in which the positive edge or the negative edge of the PWM signal is set to the detection timing; a method in which the detection timing is set with a predetermined delay from the detection of the positive edge or the negative edge; etc.

With the present embodiment, the back electromotive force detection circuit 20a sets a timing at which the transition of the level of the PWM signal Spwm occurs, from the level that corresponds to the ON state of the switch included in each of the multiple switching circuits 10u, 10v, and 10w to the level that corresponds to the OFF state thereof, to be the detection timing. For example, let us consider an arrangement in which the low-level state of the PWM signal Spwm corresponds to the OFF state of the switch, and the high-level state thereof corresponds to the ON state of the switch. With such an arrangement, the negative edge of the PWM signal Spwm is set to be the detection timing. When the condition Vu>Vcom is satisfied at the detection timing thus set, the back electromotive force detection circuit 20a outputs the back electromotive force detection signal BEMF_EDGE at the high level.

Figure 9:
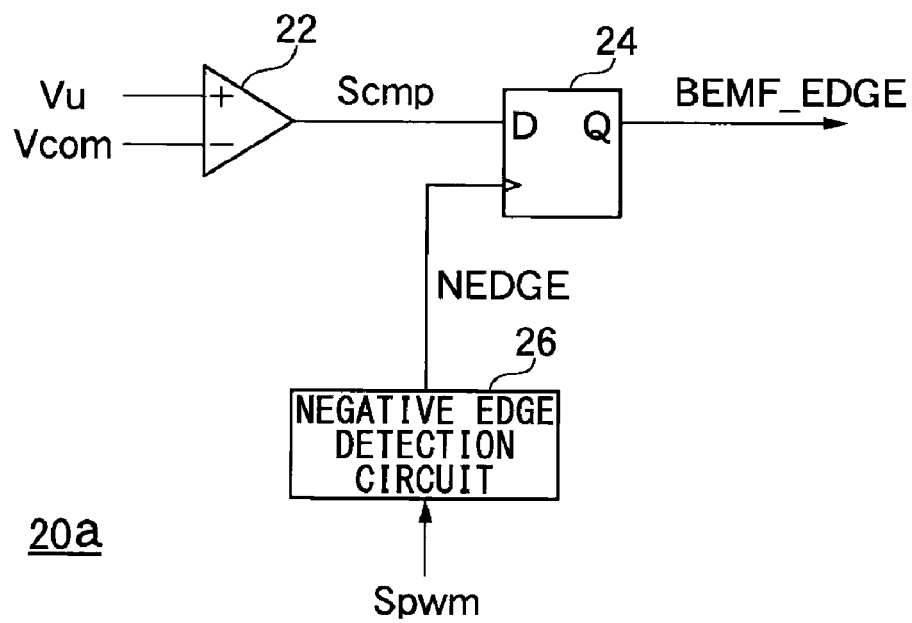
FIG. 9 is a circuit diagram which shows a configuration example of a back electromotive force detection circuit shown in FIG. 8.

FIG. 9 is a circuit diagram which shows an example of the configuration of the back electromotive force detection circuit 20a. The back electromotive force detection circuit 20a includes a comparator 22 and a comparison value output unit 24. The back electromotive force detection circuit 20a makes a comparison between the phase voltage Vu of the U-phase coil Lu and the center tap voltage Vcom. When the Vu is greater than the Vcom, the back electromotive force detection circuit 20a outputs a comparison signal Scmp at the high level.

Upon reception of the comparison signal Scmp, which is a signal output from the comparator 22, the comparison value output unit 24 outputs the value obtained at the detection timing as the back electromotive force detection signal BEMF_EDGE. The comparison value output unit 24 may have a configuration including a latch circuit which latches the output signal of the comparator 22 according to the negative edge of the PWM signal Spwm. The comparison signal Scmp is input to the input terminal D of the D-latch circuit which serves as the comparison value output unit 24. The negative edge detection circuit 26 detects the negative edge of the PWM signal Spwm. Furthermore, the negative edge detection circuit 26 outputs a negative edge signal NEDGE at the high level every time the negative edge is detected. The negative edge signal NEDGE is input to the clock terminal of the comparison value output unit 24.

Description will be made regarding the operation of the motor driving circuit 100a thus configured. FIGS. 10A through 10L are time charts which show the operation of the motor driving circuit 100a according to the embodiment. The vertical axis and the horizontal axis in FIGS. 10A through 10L are expanded or reduced as appropriate in order to facilitate understanding. Furthermore, simple waveforms are shown in the drawings in order to facilitate understanding. FIGS. 10A through 10C show the waveforms that represent the driving states of the U-phase coil Lu, the V-phase coil Lv, and the W-phase coil Lw controlled by the switching circuits 10u, 10v, and 10w, respectively. FIG. 10D shows the back electromotive force detection signal BEMF_EDGE detected by the back electromotive force detection circuit 20a. FIG. 10E shows the driving signal DRV generated by the driving timing generating circuit 32a. FIG. 10F shows the window signal WINDOW generated by the window generating circuit 40a. Furthermore, FIGS. 10G through 10L show the driving signals DRV_H and DRV_L for the high-side switch and the low-side switch of the switching circuits 10u through 10w.

As shown in FIGS. 10A through 10C, the present embodiment is driven such that the driving current is supplied in the shape of an arch-shaped waveform. It is needless to say that the present invention is not restricted to such an arrangement. Also, the driving current may be supplied in the shape of a sine wave, as described above. With the present embodiment, as shown in FIG. 10D, the back electromotive force detection signal BEMF_EDGE is generated at every zero-crossing point at which the back electromotive force Vu crosses the center tap voltage Vcom. The driving timing generating circuit 32a generates the driving signal DRV shown in FIG. 10E with a cycle which is ⅙ that of the cycle Tp1 of the back electromotive force detection signal BEMF_EDGE. The driving signal DRV may be generated with a delay Td with respect to the back electromotive force detection signal BEMF_EDGE, as shown in the drawing. The adjustment of the delay Td allows the driving of the motor to be optimized.

The driving signal synthesizing circuit 34a generates the driving signals DRV_H (U, V, W) and DRV_L (U, V, W), which are used for controlling the ON/OFF operations of the switching circuits 10u through 10w, based upon the driving signal DRV generated by the driving timing generating circuit 32. The driving sequence is set appropriately according to the conduction angle, etc.

With regard to the driving signal DRV_HU shown in FIG. 10G, the high-level state thereof corresponds to the ON state of the high-side switch of the switching circuit 10u. On the other hand, the low-level state thereof corresponds to the OFF state of the high-side switch of the switching circuit 10u. The same can be said of the other driving signals shown in FIGS. 10F through 10L, i.e., the driving signals DRV_H (V, W) and DRV_L (U, V, W). Furthermore, at least one ON state of the high-side switch and the low-side switch is subjected to pulse-width modulation so as to provide the driving waveforms shown in FIGS. 10A through 10C. Accordingly, either the high-side switch of each of the switching circuits 10u through 10w or the low-side switch thereof is repeatedly switched between the ON state and the OFF state at a high frequency.

The driving signal synthesizing circuit 34a switches the driving signals DRV_H and DRV_L for the switching circuits 10u through 10w according to a predetermined driving sequence every time the back electromotive force detection signal BEMF_EDGE is output.

Before the point in time at which the zero-crossing point occurs, the window signal WINDOW shown in FIG. 10F is set to the high-level state by the window generating circuit 40a. During a period of time in which the window generating circuit 40a maintains the high-level signal, the driving signal synthesizing circuit 34a sets the driving signals DRV_HU and DRV_LU, to be output to the switching circuit 10u, to the low-level state. This turns off the high-side switch and the low-side switch, thereby switching the state to the high impedance state. The period of time in which the state is set to the high impedance state for the detection of the zero-crossing point is indicated by the hatched areas in FIGS. 10G and 10J. When the window signal WINDOW is set to the high-level state, one terminal of the coil Lu is set to the high-impedance state. In this stage, the zero-crossing point can be detected, and the back electromotive force detection signal BEMF_EDGE is generated.

FIG. 11A through FIG. 11E are waveform diagrams which show steps for detecting the zero-crossing point in the motor driving circuit 100a according to the present embodiment. FIG. 11A shows the PWM signal Spwm. FIG. 11B shows the phase voltage Vu and the center tap voltage Vcom. FIG. 11C shows the comparison signal Scmp. FIG. 11D shows the negative edge signal NEDGE. FIG. 11E shows the back electromotive force detection signal BEMF_EDGE.

The PWM signal Spwm is supplied such that its state is repeatedly switched between the high-level state and the low-level state with a duty ratio corresponding to the torque. In the phase voltage Vu which occurs in the U-phase coil set in the non-driving state, pulse-shaped back electromotive force occurs according to the switching control operations of the other phase coils, i.e., the phase coils Lv and Lw. As shown in FIG. 11B, when the PWM signal Spwm is in the high-level state, the back electromotive force occurs in the phase voltage Vu. On the other hand, when the PWM signal Spwm is in the low-level state, the phase voltage Vu becomes a voltage around 0 V. Here, due to the signal propagation time, there is a delay between the signal transition of the PWM signal Spwm and the change in the phase voltage Vu. Accordingly, the phase voltage Vu is reduced to around 0 V with a delay from the timing at which the negative edge of the PWM signal Spwm occurs. It should be noted that, the center tap voltage is indicated by a straight line for simplification in the drawing, even though the center tap voltage Vcom is a signal provided such that the state is alternately switched between the voltage level and the low level in practice.

Figure 7A:
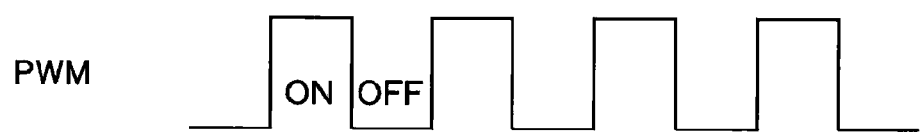
FIGS. 7A through 7C show steps for detecting a zero-crossing point in an arrangement employing a pulse modulation driving method.
Figure 7B:
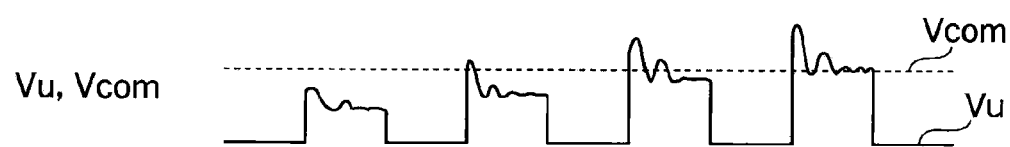
Figure 7C:

At the timing at which the PWM signal Spwm is switched to the high-level state, and the pulse voltage is applied to the other phase coils Lv and Lw, noise components occur in the phase voltage Vu shown in FIG. 11B. The comparison signal Scmp, which is obtained by making a comparison between the phase voltage Vu and the center tap voltage Vcom, is repeatedly switched between the high-level state and the low-level state as shown in FIG. 11C due to the noise components. The comparison signal Scmp is latched at the detection timing at which the negative edge signal NEDGE occurs, and the signal thus latched is output as the back electromotive force detection signal BEMF_EDGE shown in FIG. 11E. The back electromotive force detection signal BEMF_EDGE thus generated is a stable signal as compared with the back electromotive force detection signal BEMF_EDGE shown in FIG. 7C.

With the motor driving circuit 100a according to the present embodiment, the detection timing for detecting the zero-crossing point is set synchronously with the PWM signal Spwm, which is the source of the noise components in the back electromotive force Vu. As a result, the detection timing for detecting the zero-crossing point can be appropriately set to a point in time at which the adverse effects of noise are small. This prevents false detection of the zero-crossing point.

Furthermore, in many cases, the noise component, which occurs in the back electromotive force due to the pulse modulation, reaches approximately its maximum immediately after the switches connected to the coils other than the coil in which the back electromotive force to be detected occurs are turned on. Subsequently, in many cases, the noise component damps. With the present embodiment, the back electromotive force detection circuit 20a sets the timing at which signal level transition of the PWM signal Spwm occurs, from the level that corresponds to the ON state of the switches included in the multiple switching circuits 10u, 10v, and 10w to the level that corresponds to the OFF state thereof, to be the detection timing. Thus, such an arrangement allows the zero-crossing point to be detected in a state in which the noise component is small.

Next, description will be made regarding an example of an application of the motor driving circuit 100a according to the present embodiment. FIG. 6 is a block diagram which shows a configuration of the disk device 200 mounting the motor driving circuit 100a shown in FIG. 8. The disk device 200 is a unit which performs recording/reading processing on optical disks such as CDs and DVDs, and is mounted on an electronic apparatus such as a CD player, DVD player, personal computer, etc. The disk device 200 includes the pickup 210, the signal processing unit 212, the disk 214, the motor 110, and the motor driving circuit 100a.

The pickup 210 writes desired data by emitting a laser beam to the disk 214. Also, the pickup 210 reads out the data written on the disk 214 by reading the light reflected therefrom. The signal processing unit 212 performs necessary signal processing such as amplification processing, A/D conversion, D/A conversion, etc., on the data read or written by the pickup 210. The motor 110 is a spindle motor which is provided for rotating the disk 214. In particular, there is a demand for reducing the size of the disk device 200 as shown in FIG. 6. Accordingly, a sensor-less type motor, which includes no Hall element, is employed as the motor 110. The motor driving circuit 100a according to the present embodiment can be preferably used for stably driving such a sensor-less spindle motor.

Third Embodiment

Figure 12:
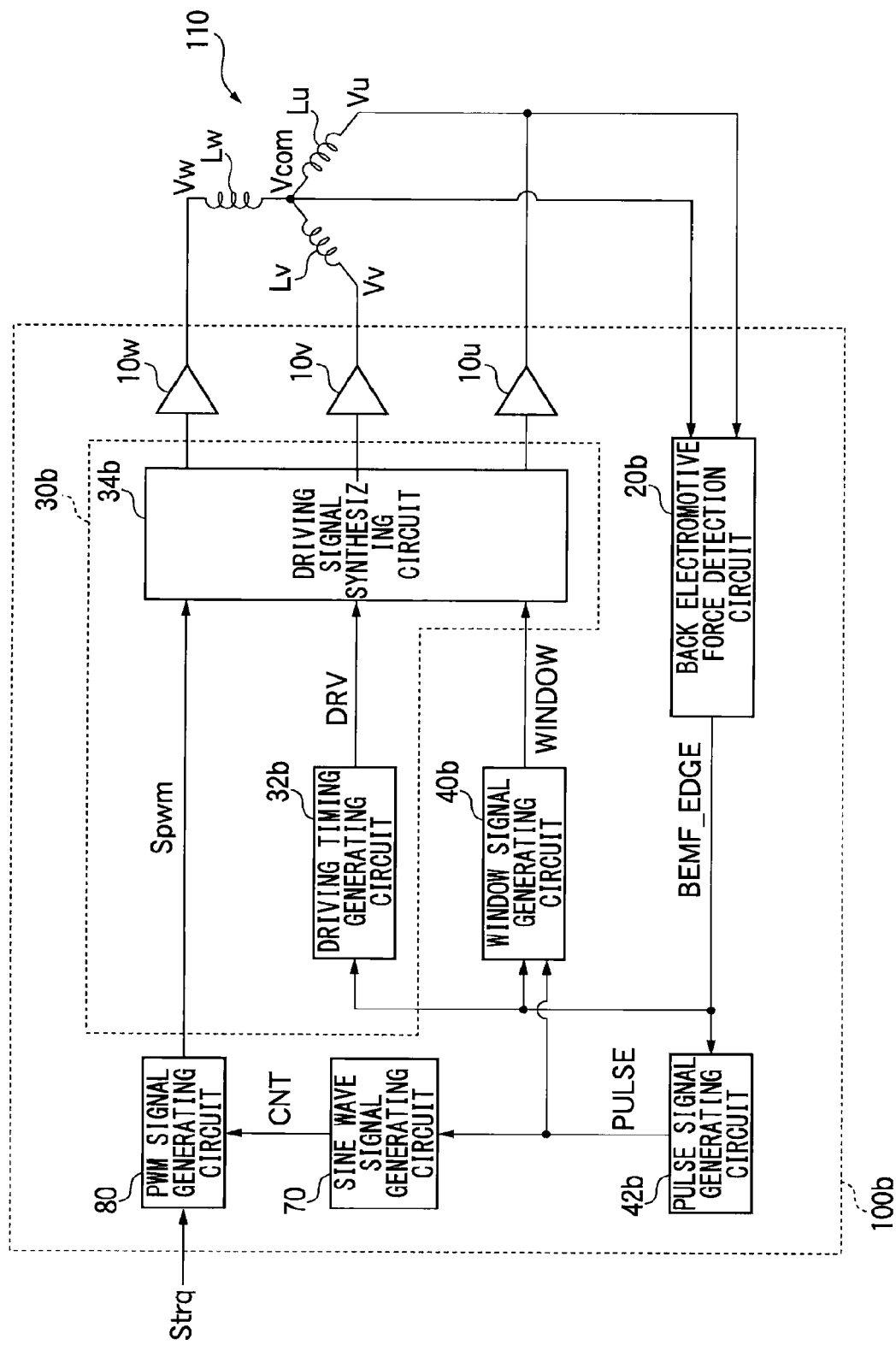
FIG. 12 is a block diagram which shows a configuration of a motor driving circuit according to a third embodiment.

FIG. 12 is a block diagram which shows a configuration of a motor driving circuit 100b according to a third embodiment. The motor driving circuit 100b controls the revolution of a sensor-less brushless DC motor (which will simply be referred to as the "motor 110" hereafter) by supplying a driving current to the motor 110. With the present embodiment, the motor 110, which is a driving target, is a three-phase DC motor including a U-phase coil Lu, a V-phase coil Lv, and a W-phase coil Lw.

The motor driving circuit 100b includes: switching circuits 10u, 10v, and 10w, which are collectively referred to as the "switching circuit(s) 10"; a back electromotive force detection circuit 20b; a switching control circuit 30b, a window signal generating circuit 40b; a pulse signal generating circuit 42b, a sine wave signal generating circuit 70; and a PWM signal generating circuit 80. The motor driving circuit 100b is monolithically integrated on a single semiconductor substrate as a functional IC. For example, the motor driving circuit 100b performs PWM (Pulse Width Modulation) driving operation using the 180 degree conduction method such that the current passes through each phase coil in the shape of an arch-shaped waveform or a sine wave.

The switching circuits 10u, 10v, and 10w are provided to the coils Lu, Lv, and Lw of the motor 110, respectively. Each of the switching circuits 10u, 10v, and 10w has a configuration including a high-side switch and a low-side switch connected in series between the power supply voltage and the ground potential. With such an arrangement, the connection node of these two switches is connected to the coil. The driving signal DRV_H (U, V, or W) and the driving signal DRV_L (U, V, or W) are input to the control terminals of the high-side switch and the low-side switch, respectively. When the high-side switch is in the ON state, each of the switching circuits 10u, 10v, and 10w applies the high-level voltage to one terminal of the coil thus connected. When the low-side switch is in the ON state, each of the switching circuits 10u, 10v, and 10w applies the low-level voltage to one terminal of the coil thus connected. In addition, when the high-side switch and the low-side switch are set to the OFF state at the same time, the coil is set to the high-impedance state.

The back electromotive force detection circuit 20b detects the zero-crossing point by making a comparison between the back electromotive force that occurs in at least one coil included in the motor 110 and the center tap voltage at a common node of the coils, and outputs the back electromotive force detection signal BEMF_EDGE. In general, the back electromotive force detection circuit 20b has a configuration including a comparator. With the present embodiment, the back electromotive force detection circuit 20b monitors the electromotive voltage Vu (which will also be referred to as "phase voltage Vu" hereafter) that occurs in the U-phase coil Lu and the center tap voltage Vcom. When the Vu is greater than the Vcom, the back electromotive force detection circuit 20b generates the back electromotive force detection signal BEMF_EDGE at the high level. The back electromotive force detection signal BEMF_EDGE thus generated is output to the switching control circuit 30b, the window signal generating circuit 40b, and the pulse signal generating circuit 42b.

The pulse signal generating circuit 42b receives the back electromotive force detection signal BEMF_EDGE output from the back electromotive force detection circuit 20b, and outputs a pulse signal PULSE with a frequency n (n is an integer which is equal to or greater than 2) times that of the back electromotive force detection signal BEMF_EDGE, synchronously with the back electromotive force detection signal BEMF_EDGE. The pulse signal PULSE is output to the sine wave signal generating circuit 70 and the window signal generating circuit 40b.

The sine wave signal generating circuit 70 receives the pulse signal PULSE from the pulse signal generating circuit 42b, and outputs a control signal CNT in the shape of a sine wave according to the pulse signal PULSE. The PWM signal generating circuit 80 generates a composite signal of the control signal CNT received from the sine wave signal generating circuit 70 and a torque signal Strq, which is an instruction signal for setting the target torque of the motor 110, thereby generating a pulse width modulated signal (which will be referred to as a "PWM signal" hereafter) subjected to pulse width modulation processing.

The switching control circuit 30b receives the back electromotive force detection signal BEMF_EDGE output from the back electromotive force detection circuit 20b, and the PWM signal Spwm output from the PWM signal generating circuit 80. The switching control circuit 30b controls the ON/OFF state sequence for the multiple switching circuits 10u, 10v, and 10w based upon the back electromotive force detection signal BEMF_EDGE, thereby adjusting the current flowing through the coils Lu, Lv, and Lw of the motor 110. Furthermore, the switching control circuit 30b controls the switching operation of at least one of the high-side switch and the low-side switch included in each of the multiple switching circuits 10u, 10v, and 10w. The switching control circuit 30b includes a driving timing generating circuit 32b and a driving signal synthesizing circuit 34b.

The driving timing generating circuit 32b receives the back electromotive force detection signal BEMF_EDGE as an input signal. The driving timing generating circuit 32b generates a driving signal DRV having a cycle of 1/6 that of the cycle Tp1 of the back electromotive force detection signal BEMF_EDGE.

The driving signal synthesizing circuit 34b generates a composite signal of the driving signal DRV and the PWM signal Spwm output from the PWM signal generating circuit 80, and outputs the composite signal thus generated to the switching circuits 10u, 10v, and 10w.

Before the detection of the zero-crossing point by the back electromotive force detection circuit 20b, the window signal generating circuit 40b outputs the window signal WINDOW at the high level. The window signal generating circuit 40b receives a back electromotive force detection signal BEMF_EDGE from the back electromotive force detection circuit 20b, and the pulse signal PULSE from the pulse signal generating circuit 42, as input signals. When the window signal generating circuit 40b detects m (m is an integer which is smaller than n) pulses of the pulse signal PULSE after the detection of the back electromotive force detection signal BEMF_EDGE, the window signal generating circuit 40b outputs the window signal WINDOW at the high level. Subsequently, when the window signal generating circuit 40b detects the next back electromotive force detection signal BEMF_EDGE, the window signal generating circuit 40b outputs the window signal WINDOW at the low level.

The integer in is preferably adjustable. For example, the motor driving circuit 100b may include a register which holds the integer m, and may have a configuration which allows the integer m to be externally set. The switching control circuit 30b receives the window signal WINDOW from the window signal generating circuit 40b. During a period of time in which the window signal WINDOW is in the high-level state, the switching control circuit 30b stops the switching of the switching circuit 10u connected to the coil Lu, in which the back electromotive force is monitored by the back electromotive force detection circuit 20b, thereby setting the state to the high impedance state. That is to say, during a period of time in which the window signal WINDOW is in the high-level state, in order to detect the zero-crossing point, a particular phase is intentionally set to the non-driving phase. With the present embodiment, during the non-driving period Tp3, the U phase is set to the non-driving phase.

Figure 13:
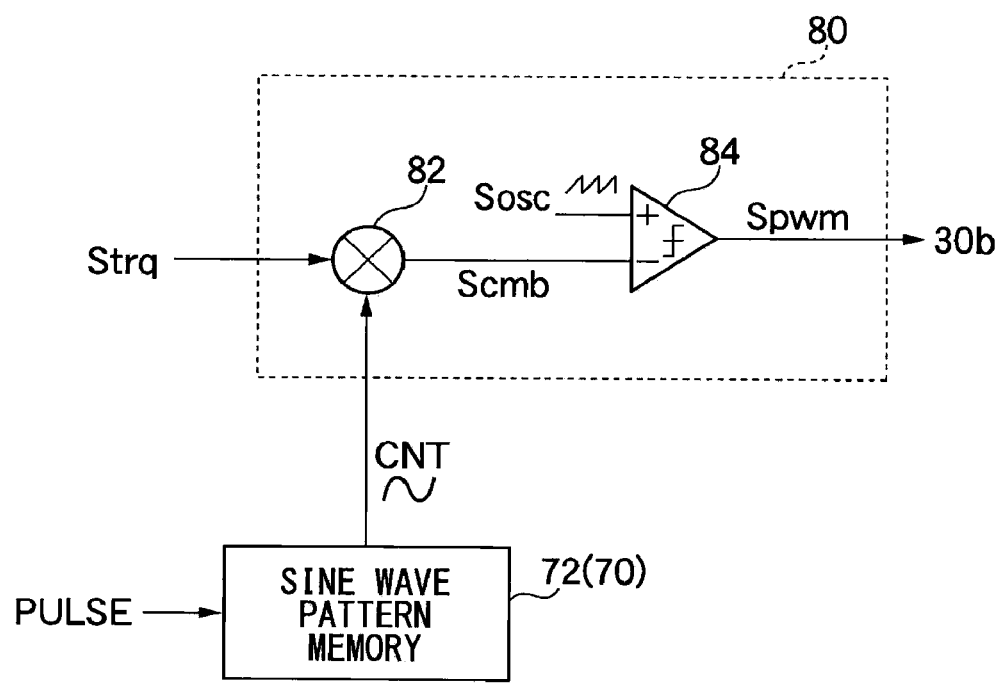
FIG. 13 is a circuit diagram which shows configurations of a sine wave signal generating circuit and a PWM signal generating circuit.

FIG. 13 is a circuit diagram which shows the configurations of the sine wave signal generating circuit 70 and the PWM signal generating circuit 80. The sine wave signal generating circuit 70 includes sine wave pattern memory 72. The sine wave pattern memory holds a control signal CNT in the shape of a sine wave, in the form of a digital value set. The sine wave signal generating circuit 70 sequentially reads out the control signal CNT in the shape of a sine wave according to the pulse signal PULSE. It should be noted that the sine wave signal generating circuit 70 may hold the control signal CNT in the form of an analog value set.

The PWM signal generating circuit 80 includes a synthesizing unit 82 and a pulse width modulator 84. The synthesizing unit 82 generates a composite signal by multiplying the control signal CNT output from the sine wave signal generating circuit 70 by the externally input torque signal Strq. The multiplication result is output as a composite signal Scmb from the synthesizing unit 82 to the pulse width modulator 84. The pulse width modulator 84 compares the composite signal Scmb received from the synthesizing unit with a predetermined periodic signal Sosc so as to generate the PWM signal Spwm. The periodic signal Sosc is a periodic signal in which the signal level changes in the shape of a triangular wave or a saw-tooth wave. The pulse width of the PWM signal Spwm thus generated is changed according to the comparison result of which of the composite signal Scmb and the periodic signal Sosc is the greater.

Figure 14:
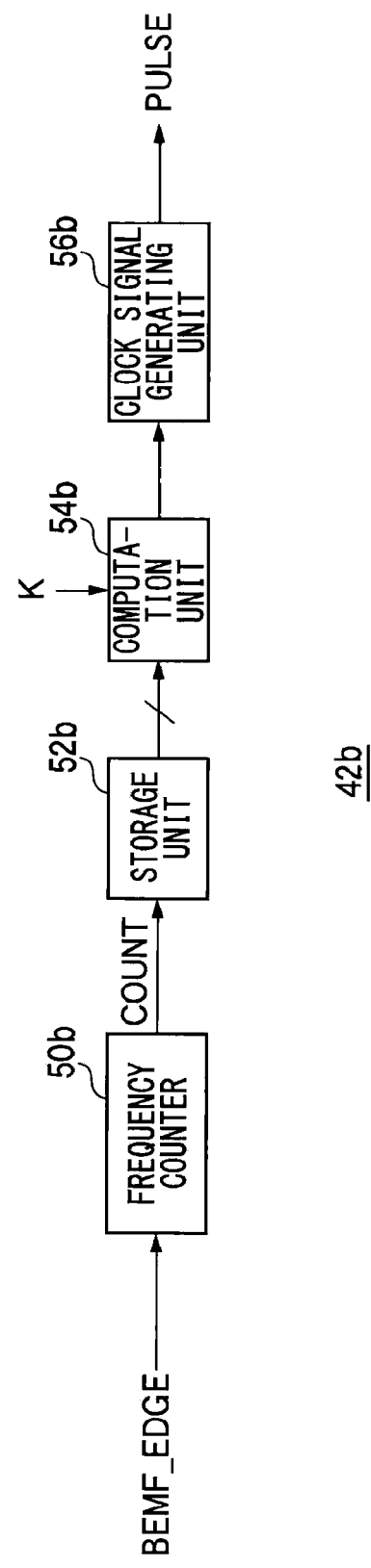
FIG. 14 is a block diagram which shows a configuration of a pulse signal generating circuit shown in FIG. 12.

FIG. 14 is a block diagram which shows the configuration of the pulse signal generating circuit 42b. The pulse signal generating circuit 42b includes a frequency counter 50b and a clock signal generating circuit 56b.

The frequency counter 50b measures the frequency of the back electromotive force detection signal BEMF_EDGE, i.e., the cycle Tp1. For example, the frequency counter 50b receives a clock signal (not shown) at a predetermined frequency as an input signal. The frequency counter 50b counts the pulses of the clock signal input during a period of time from the point in time at which a back electromotive force detection signal BEMF_EDGE is input up to a point in time at which the next back electromotive force detection signal BEMF_EDGE is input, thereby measuring the cycle Tp1 of the back electromotive force detection signal BEMF_EDGE. The frequency counter 50b sequentially outputs the count value COUNT thus measured as a frequency value.

The clock signal generating circuit 56b generates the pulse signal PULSE with a frequency n (n is an integer which is equal to or greater than 2) times that of the frequency thus measured by the frequency counter 50b. That is to say, the cycle Tp2 of the pulse signal PULSE is set to 1/n that of the cycle Tp1 of the back electromotive force detection signal BEMF_EDGE.

The clock signal generating circuit 56b performs computation on the past k (k is an integer which is equal to or greater than 1) frequency values COUNT thus measured by the frequency counter 50b. Furthermore, based upon the computation results, the clock signal generating circuit 56b sets the frequency of the pulse signal to be generated. The integer K, which corresponds to the number of frequency values to be set to the computation targets, is preferably adjustable.

In order to provide this function, the pulse signal generating circuit 42b includes a storage unit 52b and a computation unit 54b, which are components upstream of the clock signal generating circuit 56b. The storage unit 52b holds the past L (L is an integer which is equal to or greater than K) frequency values COUNT. For example, the storage unit 52b may be an L-stage shift register. The computation unit 54b executes predetermined computation based upon the frequency values thus held by the storage unit 52b. In the computation processing, simple averaging or weighted averaging may be performed.

The clock signal generating circuit 56b generates the pulse signal PULSE with a frequency that corresponds to the computation results obtained by the computation unit 54b. For example, the computation unit 54b performs computation on the latest K frequency values from among the L frequency values held by the storage unit 52b, so as to determine the frequency of the pulse signal PULSE. In the computation processing, the K count values may be subjected to simple averaging or weighted averaging. As described above, the integer K is preferably an adjustable value. Furthermore, an arrangement is preferably made which allows the integer K to be externally set. In a case of K=1, the cycle Tp2 of the pulse signal PULSE is set based upon the cycle Tp1 of the back electromotive force detection signal BEMF_EDGE obtained just before.

Figure 15:
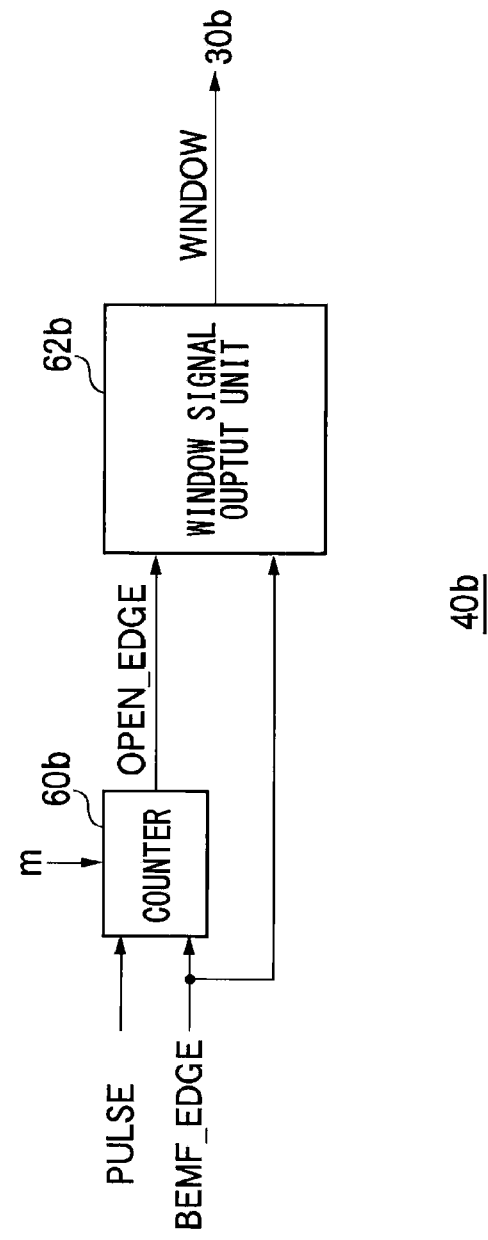
FIG. 15 is a circuit diagram which shows a configuration of a window signal generating circuit.

FIG. 15 is a circuit diagram which shows the configuration of the window signal generating circuit 40b. The window signal generating circuit 40b includes a counter 60b and a window signal output unit 62b. The window signal generating circuit 40b receives the back electromotive force detection signal BEMF_EDGE output from the back electromotive force detection circuit 20b and the pulse signal PULSE output from the pulse signal generating circuit 42b.

When the counter 60b counts m pulses of the pulse signals PULSE after the detection of a back electromotive force detection signal BEMF_EDGE, the counter 60b outputs an open edge signal OPEN_EDGE at the high level. When the counter 60b outputs the open edge signal OPEN_EDGE at the high level, the window signal output unit 62b outputs a window signal WINDOW at the high level. Subsequently, when the next back electromotive force detection signal BEMF_EDGE is detected, the window signal output unit 62b outputs the window signal WINDOW at the low level.

Description will be made regarding the operation of the motor driving circuit 100b thus configured. FIGS. 16A through 16L are time charts which show the operation of the motor driving circuit 100b according to the embodiment. The vertical axis and the horizontal axis in FIGS. 16A through 16L are expanded or reduced as appropriate in order to facilitate understanding. Furthermore, simple waveforms are shown in the drawings in order to facilitate understanding. FIGS. 16A through 16C show the waveforms that represent the driving states of the U-phase coil Lu, the V-phase coil Lv, and the W-phase coil Lw controlled by the switching circuits 10u, 10v, and 10w, respectively. FIG. 16D shows the back electromotive force detection signal BEMF_EDGE detected by the back electromotive force detection circuit 20b. FIG. 16E shows the driving signal DRV generated by the driving timing generating circuit 32b. FIG. 16F shows the window signal WINDOW generated by the window signal generating circuit 40b. Furthermore, FIGS. 16G through 16L show the driving signals DRV_H and DRV_L for the high-side switches and the low-side switches of the switching circuits 10u through 10w.

As shown in FIGS. 16A through 16C, the present embodiment is driven with the driving current being supplied such that the driving currents are shifted from one another by 120 degrees using the control signal CNT supplied in the form of a sine wave. It is needless to say that the present invention is not restricted to such an arrangement. Also, an arrangement may be made which is driven such that the driving current is supplied in the shape of an arch-shaped waveform using the control signal CNT. With the present embodiment, as shown in FIG. 16D, the back electromotive force detection signal BEMF_EDGE is generated at every zero-crossing point at which the back electromotive force Vu crosses the center tap voltage Vcom.

The driving timing generating circuit 32b generates the driving signal DRV shown in FIG. 16E with a cycle which is ⅙ that of the cycle Tp1 of the back electromotive force detection signal BEMF_EDGE. The pulse signal generating circuit 42b generates the pulse signal PULSE by performing frequency multiplication of the back electromotive force detection signal BEMF_EDGE, synchronously with the back electromotive force detection signal BEMF_EDGE. The sine wave signal generating circuit 70 generates the control signal CNT in the shape of a sine wave according to the pulse signal PULSE. Thus, as shown in FIGS. 16A through 16C, the current that flows through each of the coils Lu, Lv, and Lw is controlled synchronously with the back electromotive force detection signal BEMF_EDGE.

It should be noted that the driving signal DRV may be generated with a delay Td with respect to the back electromotive force detection signal BEMF_EDGE, as shown in the drawing. The adjustment of the delay Td allows the driving of the motor to be optimized. With such an arrangement, a delay circuit may be provided downstream of the back electromotive force detection circuit 20b.

Based upon the driving signal DRV generated by the driving timing generating circuit 32b, the driving signal synthesizing circuit 34b generates the driving signals DRV_H (U, V, H) and DRV_L (U, V, H), which are used for controlling the ON/OFF operations of the switching circuits 10u through 10w. The driving sequence is set appropriately according to the conduction angle etc.

With regard to the driving signal DRV_HU shown in FIG. 16G, the high-level state thereof corresponds to the ON state of the high-side switch of the switching circuit 10u. On the other hand, the low-level state thereof corresponds to the OFF state of the high-side switch of the switching circuit 10u. The same can be said of the other driving signals shown in FIGS. 16H through 16L, i.e., the driving signals DRV_H (V, W) and DRV_L (U, V, W). Furthermore, at least one ON state of the high-side switch and the low-side switch is controlled according to the PWM signal Spwm so as to provide the driving waveforms shown in FIGS. 16A through 16C.

Before the point in time at which the zero-crossing point occurs, the window signal WINDOW shown in FIG. 16F is set to the high-level state by the window signal generating circuit 40b. During a period of time in which the window signal generating circuit 40b maintains the high-level signal, the driving signal synthesizing circuit 34b sets the driving signals DRV_HU and DRV_LU, to be output to the switching circuit 10u, to the low-level state. This turns off the high-side switch and the low-side switch, thereby switching the state to the high impedance state. The period of time in which the state is set to the high impedance state for the detection of the zero-crossing point is indicated by the hatched areas in FIGS. 16G and 16J. When the window signal WINDOW is set to the high-level state, one terminal of the coil Lu is set to the high-impedance state. In this stage, the zero-crossing point can be detected, and the back electromotive force detection signal BEMF_EDGE is generated. When the back electromotive force detection signal BEMF_EDGE becomes the high-level state, the window signal generating circuit 40b sets the window signal WINDOW to the low-level state. When the switching circuit 10 is set to the high-impedance state, a discontinuous point occurs in the coil current as shown in FIG. 16A.

FIGS. 17A through 17E are time charts which show steps for generating the window signal WINDOW and the sine-wave-shaped control signal CNT. FIG. 17A shows the back electromotive force detection signal BEMF_EDGE. FIG. 17B shows the pulse signal PULSE generated by the pulse signal generating circuit 42b. FIG. 17C shows the open edge signal OPEN_EDGE generated by the counter 60b. FIG. 17D shows the window signal WINDOW. FIG. 17E shows the control signal CNT generated by the sine wave signal generating circuit 70.

When the back electromotive force detection signal BEMF_EDGE becomes the high-level state, the frequency counter

50b shown in FIG. 14 starts counting processing. Then, the frequency counter 50b outputs the count value COUNT, which has been counted up to a point in time at which the back electromotive force detection signal BEMF_EDGE next becomes the high-level state, to the storage unit 52b. The storage unit 52b holds at least the past one count value. With the clock cycle used for the counting processing in the frequency counter 50b as Tck, the cycle Tp1 of the back electromotive force detection signal BEMF_EDGE is represented by Tck×COUNT. The computation unit 54b determines the cycle Tp2 of the pulse signal PULSE using the past k count values such that the expression Tp2=Tp1/n is satisfied. As a result, as shown in FIG. 16B, the cycle Tp2 of the pulse signal PULSE output from the pulse signal generating circuit 42b is 1/n that of the cycle Tp1 of the back electromotive force detection signal BEMF_EDGE.

When the back electromotive force detection signal BEMF_EDGE becomes the high-level state at the point in time t0, the counter 60b shown in FIG. 15 starts to count the pulse signal PULSE output from the pulse signal generating circuit 42b. When the counter 60b counts m pulses of the pulse signals PULSE at the point in time t1, the counter 60b outputs the open edge signal OPEN_EDGE at the high level as shown in FIG. 17C.

The window signal output unit 62b maintains the window signal WINDOW at the high level during a period of time from the point in time t1 at which the open edge signal OPEN_EDGE becomes the high-level state up to the point in time t2 at which the back electromotive force detection signal BEMF_EDGE next becomes the high-level state.

Furthermore, as shown in FIG. 17E, the sine wave signal generating circuit 70 outputs the control signal CNT in the shape of a sine wave according to the pulse signal PULSE. The control signal CNT thus generated is subjected to the pulse width modulation by the PWM signal generating circuit 80, and is supplied to the coils Lu, Lv, and Lw via the switching circuits 10u, 10v, and 10w.

As described above, the motor driving circuit 100b according to the present embodiment generates the pulse signal PULSE synchronously with the back electromotive force detection signal BEMF_EDGE. Furthermore, the motor driving circuit 100b PWM controls the electric power to be supplied to the coils Lu, Lv, and Lw, based upon the pulse signal PULSE thus generated. The sine wave signal generating circuit 70 generates the control signal CNT in the shape of a sine wave according to the pulse signal PULSE. Accordingly, the frequency of the control signal CNT is adjusted such that it is proportional to the revolution of the motor. As a result, such an arrangement allows the electric power in the shape of a sine wave to be supplied to the coils according to the position of the rotor of the motor 110. This provides stable sine-wave driving operation, thereby allowing the motor 110 to be stably rotated with a desired torque.

As described above, the motor driving circuit 100b according to the present embodiment generates the window signal WINDOW at the high level during a period of time obtained by multiplying the cycle Tp1 of the back electromotive force detection signal BEMF_EDGE output from the back electromotive force detection circuit 20b by a predetermined coefficient (1−m/n) before the detection of the zero-crossing point. The period of time in which the window signal WINDOW is maintained at the high level is set to the non-driving period of time Tp3 for the detection of the zero-crossing point. As a result, the non-driving period Tp3 can be adjusted and set according to the revolution of the motor. With conventional arrangements in which the non-driving period Tp3 is set to a fixed value, there is a need to set the non-driving period Tp3 to a long period of time beforehand. On the other hand, with the present embodiment, there is no need to set the non-driving period Tp3 to such a long time beyond what is necessary. This provides smooth driving current for the motor, thereby reducing the noise produced in the motor.

With the present embodiment, the window signal WINDOW is generated based upon the pulse signal PULSE, which is a common signal that is also used for generating the control signal CNT. With such an arrangement, the timing at which the window signal WINDOW becomes the high-level state can be set to the timing at which the level of the sine-wave-shaped control signal CNT becomes zero. Such an arrangement allows the zero-crossing point to be detected with higher precision.

Furthermore, the window signal generating circuit 40b sets the window signal WINDOW to the high-level state after the elapse of a period of time (Tp2×m), which is obtained by multiplying the cycle Tp1 of the back electromotive force detection signal BEMF_EDGE by a coefficient (1−m/n), from the point in time at which a back electromotive force detection signal BEMF_EDGE is output. Subsequently, when the back electromotive force detection circuit 20b outputs the next back electromotive force detection signal BEMF_EDGE, the window signal generating circuit 40b sets the window signal WINDOW to the low-level state. As a result, before the detection of the zero-crossing point, such an arrangement allows the timing at which the state of the switching circuit 10u is to be set to the high impedance state to be set in a sure manner.

Furthermore, with the present embodiment, the window signal generating circuit 40b has a function of adjusting the number m of the pulse signals PULSE to be counted. Thus, such an arrangement allows the length of the non-driving period Tp3 to be changed according to the kind of motor to be driven etc. This provides stable driving of the motor.

Furthermore, with the present embodiment, the pulse signal generating circuit 42b has a function of adjusting the integer K. With such an arrangement, when the integer K is set to a small value, the gain of the feedback loop is increased. In this case, the response to the change in the revolution of the motor is increased. On the other hand, when the integer K is set to a large value, the gain of the feedback loop is reduced. In this case, the stability of the loop is increased. Thus, such an arrangement provides optimum driving of the motor by setting the value of K according to the kind, revolution, driving method of the motor, etc.

Next, description will be made regarding an example of an application of the motor driving circuit 100b according to the present embodiment. FIG. 6 is a block diagram which shows a configuration of the disk device 200 mounting the motor driving circuit 100b shown in FIG. 12. The disk device 200 is a unit which performs recording/reading processing on optical disks such as CDs and DVDs, and is mounted on an electronic apparatus such as a CD player, DVD player, personal computer, etc. The disk device 200 includes the pickup 210, the signal processing unit 212, the disk 214, the motor 110, and the motor driving circuit 100b.

The pickup 210 writes desired data by emitting a laser beam to the disk 214. Also, the pickup 210 reads out the data, written on the disk 214, by reading the light reflected therefrom. The signal processing unit 212 performs necessary signal processing such as amplification processing, A/D conversion, D/A conversion, etc., on the data read or written by the pickup 210. The motor 110 is a spindle motor which is provided for rotating the disk 214. In particular, there is a demand for reducing the size of the disk device 200 as shown in FIG. 6. Accordingly, a sensor-less type motor, which includes no Hall element, is employed as the motor 110. The motor driving circuit 100b according to the present embodiment can be preferably used for stably driving such a sensor-less spindle motor.

Description has been made above regarding the present invention with reference to the embodiments. The embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the scope of the present invention.

Description has been made in the first embodiment regarding an arrangement which drives a three-phase motor. Also, the present invention is suitably applied to the driving operation of a sensor-less motor other than such a three-phase motor. For example, the present invention may be applied to a five-phase motor. Also, description has been made in the first embodiment regarding an arrangement which detects a zero-crossing point by making a comparison between the U-phase back electromotive force Vu and the center tap voltage Vcom. However, the present invention is not restricted to such an arrangement. For example, an arrangement may be made in which the back electromotive force detection circuit 20a is provided for each of the U-phase, V-phase, and W-phase back electromotive forces, and the back electromotive force detection signal BEMF_EDGE is generated for each back electromotive force.

Description has been made in the first embodiment regarding an arrangement in which the zero-crossing point is detected by detecting the state in which the Vu becomes greater than the Vcom in a step in which the phase voltage Vu is increased. However, the present invention is not restricted to such an arrangement. Also, the back electromotive force detection circuit 20a may detect the zero-crossing point by detecting the state in which the Vu becomes smaller than the Vcom in a step in which the phase voltage Vu is reduced.

Description has been made in the first embodiment regarding an arrangement in which the negative edge of the PWM signal Spwm is set to be the detection timing for the zero-crossing point. However, the present invention is not restricted to such an arrangement. Also, the back electromotive force detection circuit 20a may set a point in time determined synchronously with the pulse modulated signal to be the detection timing. For example, the back electromotive force detection circuit 20a may set a point in time after the elapse of a predetermined period of time from the detection of the positive edge to be the detection timing. Such an arrangement allows a suitable zero-crossing point to be detected by adjusting the predetermined period of time.

Description has been made in the first embodiment regarding an arrangement in which the motor is driven using the 180 degree conduction PWM method. However, the present invention is not restricted to such an arrangement. Also, the present invention may be widely applied to motor driving circuits employing various kinds of pulse modulation methods.

Description has been made in the second embodiment regarding an arrangement which drives a three-phase motor. Also, the present invention is suitably applied to the driving operation of a sensor-less motor other than such a three-phase motor. For example, the present invention may be applied to a five-phase motor. Also, description has been made in the second embodiment regarding an arrangement which detects a zero-crossing point by making a comparison between the U-phase back electromotive force Vu and the center tap voltage Vcom. However, the present invention is not restricted to such an arrangement. For example, an arrangement may be made in which the back electromotive force detection circuit 20a is provided for each of the U-phase, V-phase, and W-phase back electromotive forces, and the back electromotive force detection signal BEMF_EDGE is generated for each back electromotive force.

Description has been made in the second embodiment regarding an arrangement in which the zero-crossing point is detected by detecting the state in which the Vu becomes greater than the Vcom in a step in which the phase voltage Vu is increased. However, the present invention is not restricted to such an arrangement. Also, the back electromotive force detection circuit 20a may detect the zero-crossing point by detecting the state in which the Vu becomes smaller than the Vcom in a step in which the phase voltage Vu is reduced.

Description has been made in the second embodiment regarding an arrangement in which the negative edge of the PWM signal Spwm is set to the detection timing for the zero-crossing point. However, the present invention is not restricted to such an arrangement. Also, the back electromotive force detection circuit 20a may set a point in time determined synchronously with the pulse modulated signal to the detection timing. For example, the back electromotive force detection circuit 20a may set a point in time after the elapse of a predetermined period of time from the detection of the positive edge, to the detection timing. Such an arrangement allows the suitable zero-crossing point to be detected by adjusting the predetermined period of time.

Description has been made in the second embodiment regarding an arrangement in which the motor is driven using the 180 degree conduction PWM method. However, the present invention is not restricted to such an arrangement. Also, the present invention may be widely applied to motor driving circuits employing various kinds of pulse modulation methods.

Description has been made in the third embodiment regarding an arrangement which drives a three-phase motor. Also, the present invention is suitably applied to the driving operation of a sensor-less motor other than such a three-phase motor. For example, the present invention may be applied to a five-phase motor. Also, description has been made in the third embodiment regarding an arrangement which detects a zero-crossing point by making a comparison between the U-phase back electromotive force Vu and the center tap voltage Vcom, and in which the U-phase switching circuit 10u is set to the high-impedance state during the non-driving period. However, the present invention is not restricted to such an arrangement. For example, an arrangement may be made in which the back electromotive force detection circuit 20a is provided for each of the U-phase, V-phase, and W-phase back electromotive forces, and the back electromotive force detection signal BEMF_EDGE is generated for each back electromotive force. Furthermore, the non-driving period may be set before the detection of each of the zero-crossing points of each back electromotive force. With such an arrangement, the pulse signal PULSE is generated by performing frequency multiplication of the back electromotive force detection signal BEMF_EDGE, synchronously with the back electromotive force detection signal BEMF_EDGE. Such an arrangement also provides the advantages of the present invention.

In the above-described embodiments, the settings of the high level and the low level logical values have been described for exemplary purposes only. Rather, it can be readily conceived that various modifications may be made with respect to the configuration of the logical circuit block, which are also encompassed within the scope of the present invention.

The present invention has been described with reference to the embodiments. It is needless to say that the above-described embodiments represent only mechanisms or applications of the present invention. Accordingly, it is needless to say that various modifications and changes may be made without departing from the spirit of the present invention defined in appended claims.

What is claimed is:

1. A motor driving circuit which drives a multi-phase motor having coils by supplying a driving current to the multi-phase motor, comprising:
a plurality of switching circuits each of which is provided for a corresponding coil of the multi-phase motor, and each of which applies a high-level voltage or a low-level voltage to one terminal of the coil connected to the switching circuit;
a back electromotive force detection circuit which detects a zero-crossing point by making a comparison between a back electromotive force which occurs in at least one coil of the multi-phase motor and a center tap voltage at a common node of the coils, and outputs a back electromotive force detection signal;
a switching control circuit which controls the switching state of each of the plurality of switching circuits based upon the back electromotive force detection signal output from the back electromotive force detection circuit so as to adjust the current that flows through the coils of the multi-phase motor; and
a window generating circuit which outputs a window signal which is maintained at a predetermined level during a period of time obtained by multiplying the cycle of the back electromotive force detection signal output from the back electromotive force detection circuit by a predetermined coefficient before the detection of the zero-crossing point by means of the back electromotive force detection circuit,
wherein, during a period of time in which the window signal output from the window generating circuit is maintained at the predetermined level, the switching control circuit stops the switching operation of the switching circuit, thereby setting the switching circuit to a high-impedance state.

2. A motor driving circuit according to claim 1, wherein the window generating circuit is configured such that, with the predetermined coefficient as $\alpha$ ($\alpha$ is a real number which is greater than 0, and is smaller than 1), the window generating circuit sets the window signal to the predetermined level after the elapse of a period, which is obtained by multiplying the cycle of the back electromotive force detection signal by a coefficient $(1-\alpha)$, after the output of a back electromotive force detection signal from the back electromotive force detection circuit,
and wherein, subsequently, when the back electromotive force detection circuit outputs the next back electromotive force detection signal, the window generating circuit sets the window signal to a level that differs from the predetermined level.

3. A motor driving circuit according to claim 2, wherein the window generating circuit includes:
a pulse signal generating circuit which receives the back electromotive force detection signal output from the back electromotive force detection circuit, and generates a pulse signal with a frequency n (n is an integer which is equal to or greater than 2) times that of the back electromotive force detection signal; and
a timing setting unit configured such that the timing setting unit receives the back electromotive force detection signal from the back electromotive force detection circuit and the pulse signal from the pulse signal generating circuit, and when the timing setting unit detects m (m is an integer which is smaller than n) pulse signals after the detection of a back electromotive force detection signal, the timing setting unit sets the window signal to be the predetermined signal, following which, when the timing setting unit detects the next back electromotive force detection signal, the timing setting unit sets the window signal to a level that differs from the predetermined level.

4. A motor driving circuit according to claim 3, wherein the timing setting unit includes an adjustment means which allows the integer m to be adjusted.

5. A motor driving circuit according to claim 3, wherein the pulse signal generating circuit includes:
a frequency counter which measures the frequency of the back electromotive force detection signal; and
a clock signal generating unit which generates a pulse signal with a frequency n (n is an integer which is equal to or greater than 2) times that of the frequency measured by the frequency counter.

6. A motor driving circuit according to claim 5, wherein the clock signal generating unit performs computation on the past K (K is an integer which is equal to or greater than 1) frequency values measured by the frequency counter, and sets the frequency of the pulse signal to be generated based upon the computation results.

7. A motor driving circuit according to claim 6, wherein the clock signal generating unit includes an adjustment means which allows the integer K to be adjusted.

8. A motor driving circuit according to claim 6, wherein the pulse signal generating circuit further includes:
a storage unit which holds the past L (L is an integer which is equal to or greater than K) frequency values; and
a computation unit which performs the predetermined computation based upon the frequency values held by the storage unit,
wherein the clock signal generating unit generates a pulse signal with a frequency according to the computation results obtained by the computation unit.

9. A motor driving circuit according to claim 8, wherein the storage unit is an L-stage shift register.

10. A motor driving circuit according to claim 8, wherein the computation unit performs computation on the latest K frequency values from among the L frequency values held by the storage unit so as to determine the frequency of the pulse signal.

11. A motor driving circuit according to claim 3, wherein the timing setting unit includes:
a counter configured such that the counter receives the back electromotive force detection signal output from the back electromotive force detection circuit and the pulse signal output from the pulse signal generating circuit, and when the counter counts m pulses of the pulse signal after the detection of a back electromotive force detection signal, the counter outputs an open edge signal at a predetermined level; and
a window signal output unit configured such that, when the counter outputs the open edge signal at the predetermined level, the window signal output unit outputs a window signal at the predetermined level, following which, when the window signal output unit detects the next back electromotive force detection signal, the window signal output unit outputs the window signal at a level that differs from the predetermined level.

12. A motor driving circuit according to claim 1, which is monolithically integrated on a single semiconductor substrate.

13. A disk apparatus including:
a spindle motor which rotates a disk; and
a motor driving circuit according to claim 1, which drives the spindle motor.

14. A motor driving circuit which drives a multi-phase motor by supplying a driving current to the multi-phase motor, comprising:
a plurality of switching circuits each of which is provided for a corresponding coil of the multi-phase motor, and each of which applies a high-level voltage or a low-level voltage to one terminal of the coil connected to the switching circuit;

a pulse modulated signal generating circuit which generates a pulse modulated signal a duty ratio of which changes according to at least a target torque of the multi-phase motor;

a back electromotive force detection circuit which detects a zero-crossing point by making a comparison between a back electromotive force which occurs in at least one coil of the multi-phase motor and a center tap voltage at a common node of the coils, and outputs a back electromotive force detection signal; and a switching control circuit which receives the pulse modulated signal from the pulse modulated signal generating circuit and the back electromotive force detection signal from the back electromotive force detection circuit, and which controls a sequence of the ON/OFF state of the plurality of switching circuits based upon the back electromotive force detection signal, and which controls the switching operation of at least one of a high-side switch and a low-side switch included in the plurality of switching circuits, wherein the back electromotive force detection circuit sets a detection timing based upon the pulse modulated signal from the pulse modulated signal generating circuit, and wherein, when the comparison result between the back electromotive force and the center tap voltage satisfies a predetermined condition at the detection timing thus set, the back electromotive force detection circuit outputs the back electromotive force detection signal at a predetermined level.

15. A motor driving circuit according to claim 14, wherein the back electromotive force detection circuit sets the detection timing based upon the timing of the level transition of the pulse modulated signal.

16. A motor driving circuit according to claim 15, wherein the back electromotive force detection circuit sets the timing at which the level of the pulse modulated signal transits from the level that corresponds to the ON state of the switches included in the plurality of switching circuits to the level that corresponds to the OFF state thereof to be the detection timing.

17. A motor driving circuit according to claim 14, wherein, when the comparison result between the back electromotive force and the center tap voltage satisfies a predetermined condition at the detection timing, the back electromotive force detection circuit outputs the back electromotive force detection signal.

18. A motor driving circuit according to claim 14, wherein the back electromotive force detection circuit includes:
a comparator which compares the back electromotive force with the center tap voltage; and
a comparison value output unit which receives the output signal of the comparator, and outputs the value at the detection timing.

19. A motor driving circuit according to claim 18, wherein the comparison value output unit is a latch circuit which latches the output signal of the comparator according to the pulse modulated signal.

20. A motor driving circuit according to claim 14, which is monolithically integrated on a single semiconductor substrate.

21. A disk apparatus including:
a spindle motor which rotates a disk; and
a motor driving circuit according to claim 14, which drives the spindle motor.

22. A motor driving method for supplying a driving current to a multi-phase motor having coils so as to drive the multi-phase motor, comprising:
generating a pulse modulated signal a duty ratio of which changes according to at least the target torque of the multi-phase motor;

back electromotive force detection in which a zero-crossing point is detected by comparing a back electromotive force that occurs in at least one coil of the multi-phase motor with a center tap voltage at a common node of the coils, and a back electromotive force detection signal is output at a predetermined level;

controlling a sequence of the coils to be driven based upon the back electromotive force detection signal;

applying a switching signal at a high level or a low level to the coils to be driven based upon the pulse modulated signal, wherein, in the back electromotive force detection, a detection timing is set based upon the pulse modulated signal, and when the comparison result between the back electromotive force and the center tap voltage satisfies a predetermined condition at the detection timing thus set, the back electromotive force detection signal is set to the predetermined level.

23. A motor driving circuit which drives a multi-phase motor by supplying a driving current to the multi-phase motor, comprising:
a plurality of switching circuits each of which is provided for a corresponding coil of the multi-phase motor, and each of which applies a high-level voltage or a low-level voltage to one terminal of the coil connected to the switching circuit;

a back electromotive force detection circuit which detects a zero-crossing point by making a comparison between a back electromotive force which occurs in at least one coil of the multi-phase motor and a center tap voltage at a common node of the coils, and outputs a back electromotive force detection signal at a predetermined level;

a pulse signal generating circuit which receives the back electromotive force detection signal, and generates a pulse signal, with a frequency which is obtained by multiplying that of the back electromotive force detection signal by n (n is an integer which is equal to or greater than 2), synchronously with the back electromotive force detection signal;

a sine wave signal generating circuit which receives the pulse signal from the pulse signal generating circuit, and outputs a control signal in the shape of a sine wave according to the pulse signal;

a pulse modulated signal generating circuit which generates a pulse modulated signal subjected to pulse modulation by synthesizing the control signal output from the sine wave signal generating circuit and a torque signal which is an instruction signal for setting the target torque of the multi-phase motor; and a switching control circuit which receives the back electromotive force detection signal from the back electromotive force detection circuit and the pulse modulated signal from the pulse modulated signal generating circuit, and which controls a sequence of the ON/OFF state of the plurality of switching circuits based upon the back electromotive force detection signal, and which controls the switching operation of at least one of a high-side switch and a low-side switch included in the plurality of switching circuits.

24. A motor driving circuit according to claim 23, wherein the sine wave signal generating circuit includes a storage unit which holds the control signal in the shape of a sine wave, and wherein the sine wave signal generating circuit sequentially reads out and outputs the control signal in the shape of a sine wave according to the pulse signal.

25. A motor driving circuit according to claim 23, wherein the pulse modulated signal generating circuit includes:
a synthesizing unit which outputs a composite signal obtained by multiplying the control signal by the torque signal; and a pulse modulator which compares the composite signal output from the synthesizing unit with a predetermined cycle signal, and which generates a pulse modulated signal a duty ratio of which changes according to the comparison result of which of the composite signal and the predetermined cycle signal is the greater.

26. A motor driving circuit according to claim 23, wherein the pulse signal generating circuit includes:
   a frequency counter which measures the frequency of the back electromotive force detection signal;
   a clock signal generating circuit which generates a pulse signal with a frequency n (n is an integer which is equal to or greater than 2) times that of the frequency measured by the frequency counter.

27. A motor driving circuit according to claim 26, wherein the clock signal generating unit performs computation on the past K (K is an integer which is equal to or greater than 1) frequency values measured by the frequency counter, and sets the frequency of the pulse signal to be generated based upon the computation results.

28. A motor driving circuit according to claim 27, wherein the clock signal generating unit includes an adjustment means which allows the integer K to be adjusted.

29. A motor driving circuit according to claim 27, wherein the pulse signal generating circuit further includes:
   a storage unit which holds the past L (L is an integer which is equal to or greater than K) frequency values; and
   a computation unit which performs the predetermined computation based upon the frequency values held by the storage unit,
   wherein the clock signal generating unit generates a pulse signal with a frequency according to the computation results obtained by the computation unit.

30. A motor driving circuit according to claim 29, wherein the storage unit is an L-stage shift register.

31. A motor driving circuit according to claim 29, wherein the computation unit performs computation on the latest K frequency values from among the L frequency values held by the storage unit so as to determine the frequency of the pulse signal.

32. A motor driving circuit according to claim 23, further including a window signal generating circuit configured such that the window signal generating circuit receives the back electromotive force from the back electromotive force detection circuit and the pulse signal from the pulse signal generating circuit, and when the window signal generating circuit detects m (m is an integer which is smaller than n) pulses of the pulse signal after the detection of a back electromotive force detection signal, the window signal generating circuit outputs a window signal at a predetermined level, following which, when the window signal generating circuit detects the next back electromotive force detection signal, the window signal generating circuit outputs the window signal at a level that differs from the predetermined level,
   wherein the switching control circuit receives the window signal from the window signal generating circuit, and during a period in which the window signal is maintained at the predetermined level, the switching control circuit stops the switching operation of the switching circuit connected to the coil to be monitored by the back electromotive force detection circuit with respect to the back electromotive force, thereby setting the switching circuit to the high-impedance state.

33. A motor driving circuit according to claim 32, wherein the window signal generating circuit includes an adjustment means which allows the integer m to be adjusted.

34. A motor driving circuit according to claim 32, wherein the window signal generating circuit includes:
   a counter configured such that the counter receives the back electromotive force detection signal output from the back electromotive force detection circuit and the pulse signal output from the pulse signal generating circuit, and when the counter counts m pulses of the pulse signal after the detection of a back electromotive force detection signal, the counter outputs an open edge signal at a predetermined level; and
   a window signal output unit configured such that, when the counter outputs the open edge signal at the predetermined level, the window signal output unit outputs the window signal at the predetermined level, following which, when the window signal output unit detects the next back electromotive force detection signal, the window signal output unit outputs the window signal at a level that differs from the predetermined level.

35. A motor driving circuit according to claim 23, which is monolithically integrated on a single semiconductor substrate.

36. A disk apparatus including:
   a spindle motor which rotates a disk; and
   a motor driving circuit according to claim 23, which drives the spindle motor.

37. A motor driving method for supplying a driving current to a multi-phase motor having coils so as to drive the multi-phase motor, comprising:
   detecting a zero-crossing point by comparing a back electromotive force that occurs in at least one coil of the multi-phase motor with a center tap voltage at a common node of the coils, and generating a back electromotive force detection signal at a predetermined level;
   generating a pulse signal with a frequency n (n is an integer which is equal to or greater than 2) times that of the frequency of the back electromotive force detection signal, synchronously with the back electromotive force detection signal;
   generating a control signal in the shape of a sine wave according to the pulse signal;
   synthesizing the control signal and a torque signal which is an instruction signal for setting the target torque of the multi-phase motor and generating a pulse modulated signal by modulating the synthesized signal; and
   controlling a sequence of the coils to be driven based upon the back electromotive force detection signal, and applying a switching signal at a high level or a low level to the coils to be driven based upon the pulse modulated signal.

38. A motor driving method according to claim 37, further including:
   generation of a window signal wherein, when m (m is an integer which is smaller than n) pulses of the pulse signal are detected after the detection of a back electromotive force detection signal, the window signal is generated at a predetermined level, following which, when the next back electromotive force detection signal is detected, the window signal is generated at a level that differs from the predetermined level; and
   setting a switching circuit, which is connected to a coil to be monitored with respect to the back electromotive force for detecting the zero-crossing point, to a high-impedance state during a period in which the window signal is maintained at the predetermined level.

* * * * *